United States Patent
Goldstein et al.

(10) Patent No.: US 10,348,576 B2
(45) Date of Patent: Jul. 9, 2019

(54) MODELING RESILIENCY STRATEGIES FOR STREAMING QUERIES

(71) Applicant: Microsoft Technology Licensing, LLC, Redmond, WA (US)

(72) Inventors: Jonathan D. Goldstein, Woodinville, WA (US); Badrish Chandramouli, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 15/142,873

(22) Filed: Apr. 29, 2016

(65) Prior Publication Data

US 2017/0317893 A1  Nov. 2, 2017

(51) Int. Cl.
G06F 15/16 (2006.01)
H04L 12/24 (2006.01)

(52) U.S. Cl.
CPC ...... *H04L 41/5003* (2013.01); *H04L 41/5009* (2013.01)

(58) Field of Classification Search
None
See application file for complete search history.

(56) References Cited

U.S. PATENT DOCUMENTS

| | | | |
|---|---|---|---|
| 5,423,037 A | 6/1995 | Hvasshovd | |
| 7,730,364 B2 | 6/2010 | Chang et al. | |
| 9,158,540 B1 | 10/2015 | Tzelnic et al. | |
| 2003/0172145 A1* | 9/2003 | Nguyen | G06Q 10/10 709/223 |
| 2007/0112803 A1 | 5/2007 | Pettovello | |
| 2009/0271512 A1* | 10/2009 | Jorgensen | H04L 1/20 709/224 |
| 2009/0319687 A1 | 12/2009 | Goldstein et al. | |
| 2010/0030896 A1* | 2/2010 | Chandramouli | G06F 16/24568 709/224 |
| 2010/0198807 A1 | 8/2010 | Kuno et al. | |
| 2012/0232947 A1* | 9/2012 | McLachlan | G06Q 10/06 705/7.23 |
| 2012/0304003 A1 | 11/2012 | Goldstein et al. | |
| 2012/0311581 A1* | 12/2012 | Balmin | G06F 9/5066 718/100 |
| 2014/0372438 A1 | 12/2014 | Chandramouli et al. | |

(Continued)

OTHER PUBLICATIONS

Li, et al., "Multi-dimensional Range Queries in Sensor Networks", In Proceedings of the 1st international conference on Embedded networked sensor systems, Nov. 5, 2003, pp. 63-75.

(Continued)

*Primary Examiner* — Phyllis A Book
(74) *Attorney, Agent, or Firm* — Schwegman Lundberg & Woessner, P.A.

(57) ABSTRACT

Costs associated with deploying a streaming query according to one or more resiliency strategies given a particular service level agreement (SLA) specification are modeled to enable selection and/or recommendation of a particular resiliency strategy. A baseline cost model represents costs associated with deploying the streaming query non-resiliently. For each of any number of resiliency strategies, a resiliency model represents additional costs associated with deploying the streaming query according to a particular resiliency strategy.

21 Claims, 15 Drawing Sheets

(56) References Cited

U.S. PATENT DOCUMENTS

2015/0309831 A1* 10/2015 Powers ............ G06F 16/24565
718/1
2016/0301579 A1* 10/2016 Djukic ................ H04L 41/5009
2017/0242591 A1* 8/2017 Jagannath ............. G06F 3/0644
2017/0242784 A1* 8/2017 Heorhiadi ........... G06F 11/3692

OTHER PUBLICATIONS

Li, Xin, et al., "Multi-dimensional Range Queries in Sensor Networks", In Proceedings of the 1st International Conference on Embedded networked sensor systems, Nov. 5, 2003, pp. 63-75.

* cited by examiner

MODELING RESILIENCY STRATEGIES FOR STREAMING QUERIES

BACKGROUND

Streaming query deployments make up a vital part of cloud oriented applications, like online advertising, online analytics, and Internet of things scenarios. Streaming query deployments vary widely in their data, logic, and statefulness, and are typically executed in multi-tenant distributed environments with varying uptime service level agreements (SLAs). In order to achieve a specified SLA, any number of resiliency strategies may be employed to protect against failure and data loss. However, choosing a particular resiliency strategy for a particular streaming query deployment is scenario dependent and not straightforward.

For example, a first streaming query deployment may have a small to moderate event rate (e.g., tens of thousands of events per second) and a very large number of states (e.g., one for each browsing session), which are active for a short period of time, then typically expire after a long holding period. Rather than redundantly store states in RAM, states may be cached in the streaming nodes for a period, then be sent to a key-value store after some time, where they are written redundantly to cheap storage, and typically expire, un-accessed. As a result, the RAM needed for streaming nodes in this scenario is small, and may be checkpointed and recovered cheaply.

In contrast, an online gaming system, with a high event rate (e.g., millions of events per second), a large number of active users, and little locality for a cache to leverage, would require a stronger resiliency strategy to maintain a similar SLA. That is, the tolerance for recovery latency in an online gaming system is very low, making it very difficult to recover a failed node quickly enough.

While various resiliency strategies exist, and different resiliency strategies are better suited for different streaming query deployments, there are no reliable rules or guidelines for selecting a particular resiliency strategy for a particular streaming query deployment.

SUMMARY

This disclosure describes techniques for modeling resiliency strategies for deploying streaming queries to conform with a specified service level agreement. Parameters defining a streaming query deployment are used to model a baseline cost of a non-resilient deployment of the streaming query. Additional parameters defining the SLA and the deployment environment are used to model the cost of deploying the streaming query according to one or more resiliency strategies. The modeled costs can be used to select and/or recommend one or more resiliency strategies for a particular streaming query given a particular SLA specification.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Techniques for modeling resiliency strategies for streaming queries are described herein. While many streaming resiliency strategies are currently known, there is no known tool to quantify the performance and cost tradeoffs across the various resiliency strategies in a way that is actionable in today's cloud computing environments. Lacking tools to prescribe resiliency strategies for particular scenarios, practitioners typically choose the technique which is easiest to implement or build systems tailored to solve particular classes of problems, hoping that these systems will have high general applicability.

By modeling a baseline cost associated with a particular streaming query deployment, and then modeling the additional costs to implement each of one or more resiliency strategies to conform with a desired service level agreement (SLA), a system administrator is able to make a cost-effective and SLA-compliant selection of a particular resiliency strategy.

Illustrative Environment

Figure 1:
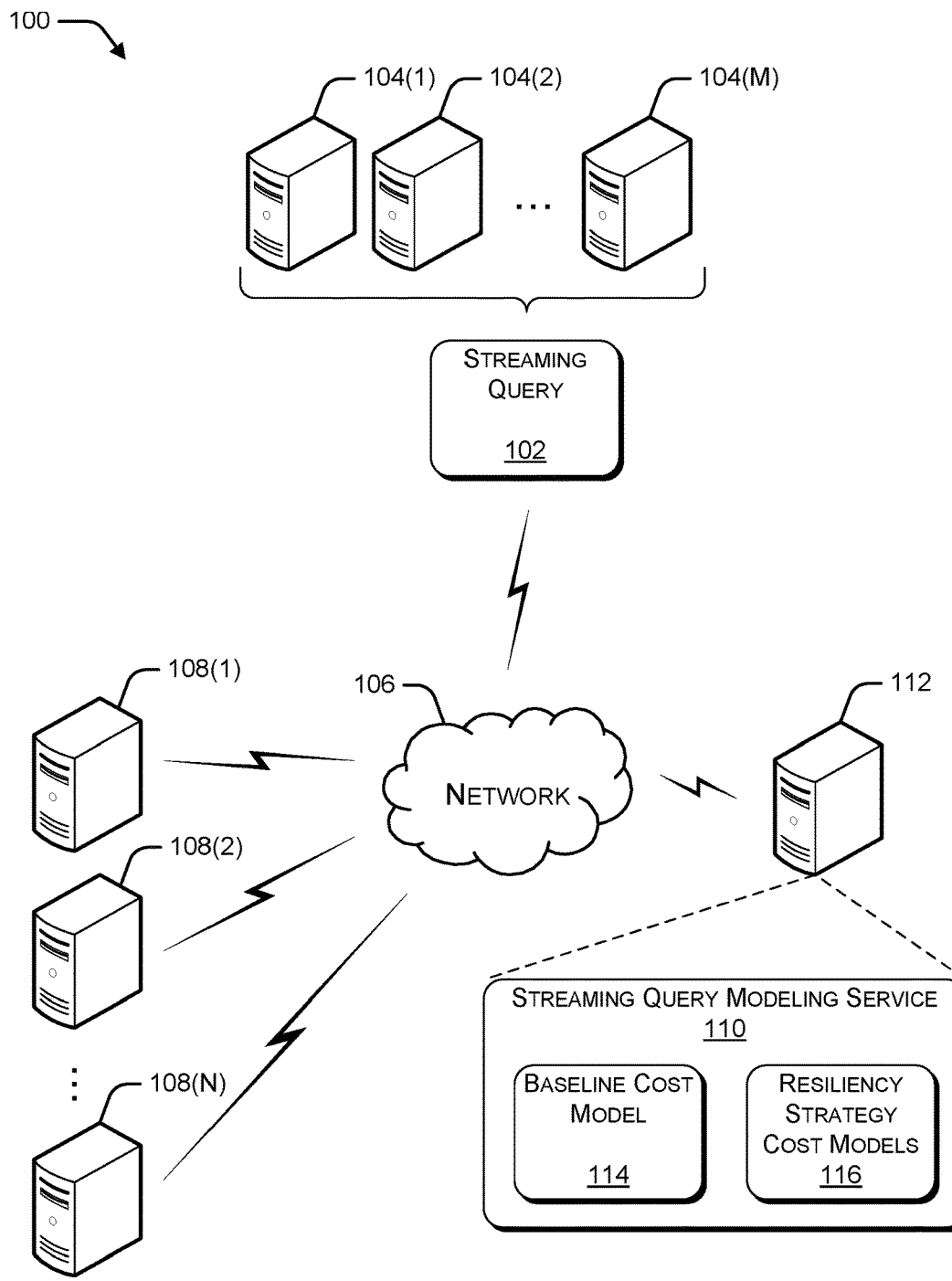
FIG. 1 is a pictorial diagram illustrating an example environment for modeling resiliency strategies for streaming queries.

FIG. 1 illustrates an example environment 100 in which resiliency strategies for streaming queries can be modeled. In the illustrated example, a streaming query 102 is deployed using computing resources 104, which may include, for example, one or more ingress nodes, one or more compute nodes, and one or more storage nodes to support the streaming query deployment. Streaming query 102 may be configured to receive data over a network 106 from distributed resource such as, for example, web servers 108. Environment 100 also includes streaming query modeling service 110, which may be implemented on a network accessible server 112. Streaming query modeling service 110 includes baseline cost model 114 and resiliency strategy cost models 116.

Baseline cost model 114 receives as input, various parameters associated with the deployment of streaming query 102. Based on the received input, baseline cost model 114 calculates a baseline cost of the streaming query deployment.

Resiliency strategy cost models 116 calculate, for each of one or more resiliency strategies, a cost increase over the baseline cost of the streaming query deployment, where the cost increase represents the cost to implement the particular resiliency strategy for a given SLA.

Network 106 can include, for example, public networks such as the Internet, private networks such as an institutional and/or personal intranet, or some combination of private and public networks. Network 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network 106 can utilize communications protocols, including packet-based and/or datagram-based protocols such as internet protocol (IP), transmission control protocol (TCP), user datagram protocol (UDP), or other types of protocols. Moreover, network 106 can also include a number of devices that facilitate network communications and/or form a hardware basis for the networks, such as switches, routers, gateways, access points, firewalls, base stations, repeaters, backbone devices, and the like.

In some examples, network 106 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Examples support scenarios where computing devices 104, 108, and 112 can include one or more computing devices that operate in a cluster or other grouped configuration to share resources, balance load, increase performance, provide fail-over support or redundancy, or for other purposes. Any one or more of computing devices 104, 108, and 112 can belong to a variety of categories or classes of devices such as traditional server-type devices, desktop computer-type devices, mobile-type devices, special purpose-type devices, embedded-type devices, and/or wearable-type devices. Thus, although illustrated as a single type of device, devices 104, 108, and 112 can include a diverse variety of device types and are not limited to a particular type of device. Devices 104, 108, and 112 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Baseline Cost

Figure 2:
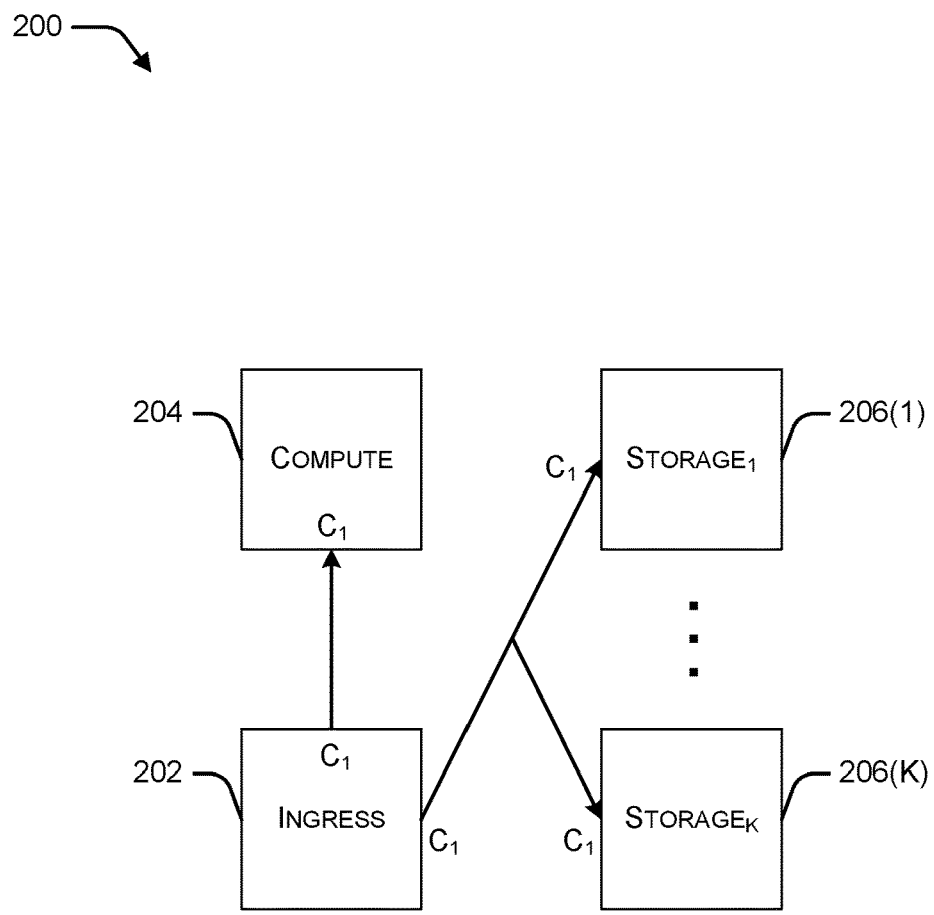
FIG. 2 is a block diagram illustrating an example logical network flow model for a streaming query deployed with no resiliency strategy.

FIG. 2 illustrates a model 200 of network flows associated with a streaming query 102 when computation is not resilient to failure, i.e., when the streaming query is deployed with no resiliency strategy. In the models described herein, the costs associated with the network flows, as measured at the network interface card (NIC), form the baseline cost to which all of the resiliency strategy costs are compared.

Model 200 includes an ingress node 202 at which data for the streaming query is received, a single compute node 204 at which the streaming query calculations are executed, and multiple storage nodes 206 shown as storage nodes 206(1)-206(K).

The model illustrated in FIG. 2 is based on a number of assumptions. First, the data could initially be acquired by the ingress node 202 with a network flow arriving at the node, although the data could also be born at this node. In either case, whether or not a resiliency strategy is implemented, the cost of acquiring the data does not change, and so, the cost of acquiring the data is not reflected in the model illustrated in FIG. 2. Second, there is a network flow transmitting the input to the compute node 204, as well as a network flow to each of the storage nodes 206 on which a copy of the data will be stored. In the illustrated model, there is only one path on the ingress node 202 to all of the storage nodes 206 which store the data. This model captures the costs in common with various implementations of cloud storage. That is, in any cloud storage implementation, the ingress node pushes a copy of the data to each of K storage nodes, even though internal network communication may be reduced with interesting topologies and/or broadcast networks may vary amongst specific implementations. These varying costs could be accounted for in a specific model. For example, costs associated with storage bandwidth and/or CPU costs could easily be added to the models described herein. However, for the discussion herein, the model in FIG. 2 is used, which reflects common costs across various implementations. Furthermore, the storage nodes 206 in FIG. 2 are logical, as a single copy of the data may actually be spread out over a large number of nodes in a storage cluster. The aggregate NIC bandwidth is, however, insensitive to such data distribution, and so, each storage node 206 in FIG. 2 represents a single copy of the received data.

NIC costs are associated with each end of each network flow. In the illustrated model, the NIC costs at each end are symmetric, and these costs are represented in FIG. 2 as $C_1$. However, because the NIC costs are accounted for at each end of each network flow, asymmetric network costs can also be represented and accounted for using the model described herein. For the calculations described herein, $C_1 = F_T$, where $F_T$ represents the mean time between failures for a single node. That is, as described herein, all costs are computed by determining the costs to individual NICs between consecutive failures of a single node, which, on average, occurs every $F_T$ time units.

Therefore, according to the baseline model 200 shown in FIG. 2, the baseline cost, adding up all of the network flow costs at both sender and receiver, is $2 \cdot F_T$ for the ingress node, $F_T$ for the compute node, and $K \cdot F_T$ for the storage nodes, which leads to:

$$\text{baseline cost} = (K+3) \cdot F_T \quad (1)$$

Introduction to Resiliency Strategies

The resiliency strategies described herein can be generalized into three categories: replay-based, periodic checkpointing-based, and on-demand checkpointing-based. In each resiliency strategy described herein, there is an assumption that there is a resilient store, and that all input is journaled to the resilient store.

Figure 3:
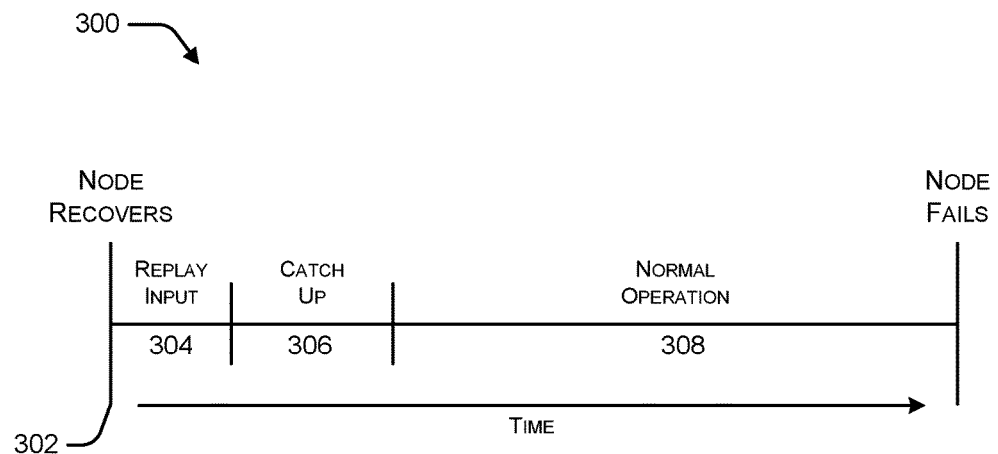
FIG. 3 is a timeline diagram illustrating an example sequence of operations associated with a replay-based resiliency strategy.

FIG. 3 illustrates an example timeline 300 associated with a replay-based resiliency strategy. Replay based strategies leverage knowledge of the query's window size. For example, in a one minute trailing average, the window size is one minute. Note that such information is not always available, in which case, replay-based resiliency approaches are not possible.

In a single node version, as represented by the replay-based timeline 300, when the compute node goes down, a new compute node is created. The timeline 300, begins at the point in time 302 at which the new compute node is created. Upon creation, the new node immediately consumes a window of input, as represented in FIG. 3 by time segment 304. During this time, the query falls further behind, so it subsequently enters a catchup phase, as represented by time segment 306, until normal operation can resume, as represented by time segment 308. A single node resiliency strategy can be implemented such that a new node can begin consuming input from a point in time which guarantees no loss of output, or can choose a moment later in time, which will result in some data loss, but will minimize catchup time.

In contrast to the single-node version, for active-active replay, multiple computer nodes simultaneously run the same query. As used herein, "active-active" indicates a resiliency strategy that relies on two or more compute nodes. When one of the compute nodes fails, it recovers in the same manner as in single node replay. However, the query is only down if all the running compute nodes go down at the same time. Active-active approaches can be useful for meeting difficult SLAs, but there remains the outstanding question of how many duplicate compute nodes should be run for a given scenario and SLA.

Figure 4:
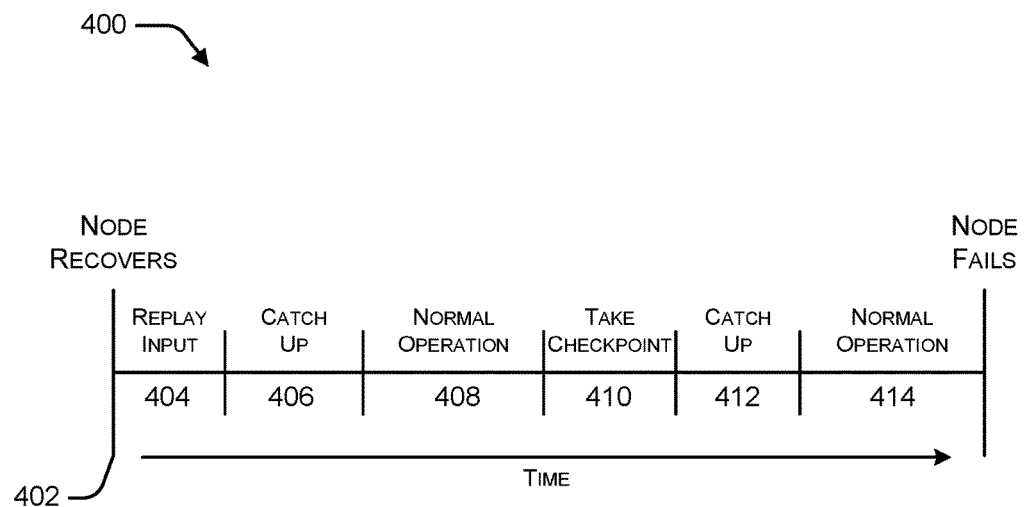
FIG. 4 is a timeline diagram illustrating an example sequence of operations associated with a periodic checkpointing-based resiliency strategy.

FIG. 4 illustrates an example timeline 400 associated with a period checkpointing-based resiliency strategy. Period checkpointing-based resiliency strategies can be implemented in systems that have the ability to checkpoint the state of a running query. As illustrated in FIG. 4, the running query periodically checkpoints its state to a resilient store. When a compute node fails, a new compute node is started, as represented by the beginning of the timeline 402. During an initial time period 404, the latest checkpoint is read and rehydrated on the new compute node. While the latest checkpoint is being read and rehydrated, the new compute node falls behind with regard to processing the streaming query, so a catch up time period 406 follows the initial time period 404. The new compute node then enters a normal operation mode, represented by time segment 408, which continues until it is time to take another checkpoint, which occurs during time segment 410. While taking the checkpoint, the compute node falls behind with regard to processing the steaming query, so another catch up time period 412 follows the checkpoint time period 414 before resuming normal operation, as represented by time segment 416.

In an active-active periodic checkpointing-based resiliency strategy, multiple copies (e.g., two or more) of the query are run simultaneously on different compute nodes, while one of the copies takes periodic checkpoints. When one copy fails, the checkpointing stops and a new copy is spun up as in the single node version. Once all of the compute nodes are running again, checkpointing resumes.

Checkpointing-based solutions are typically chosen when either replay solutions aren't possible or when the checkpoint size is significantly smaller than the input needed to reproduce it. When choosing a checkpointing-based solution, questions to be answered include how much smaller does the checkpoint need to be and are there other important factors?

Figure 5:
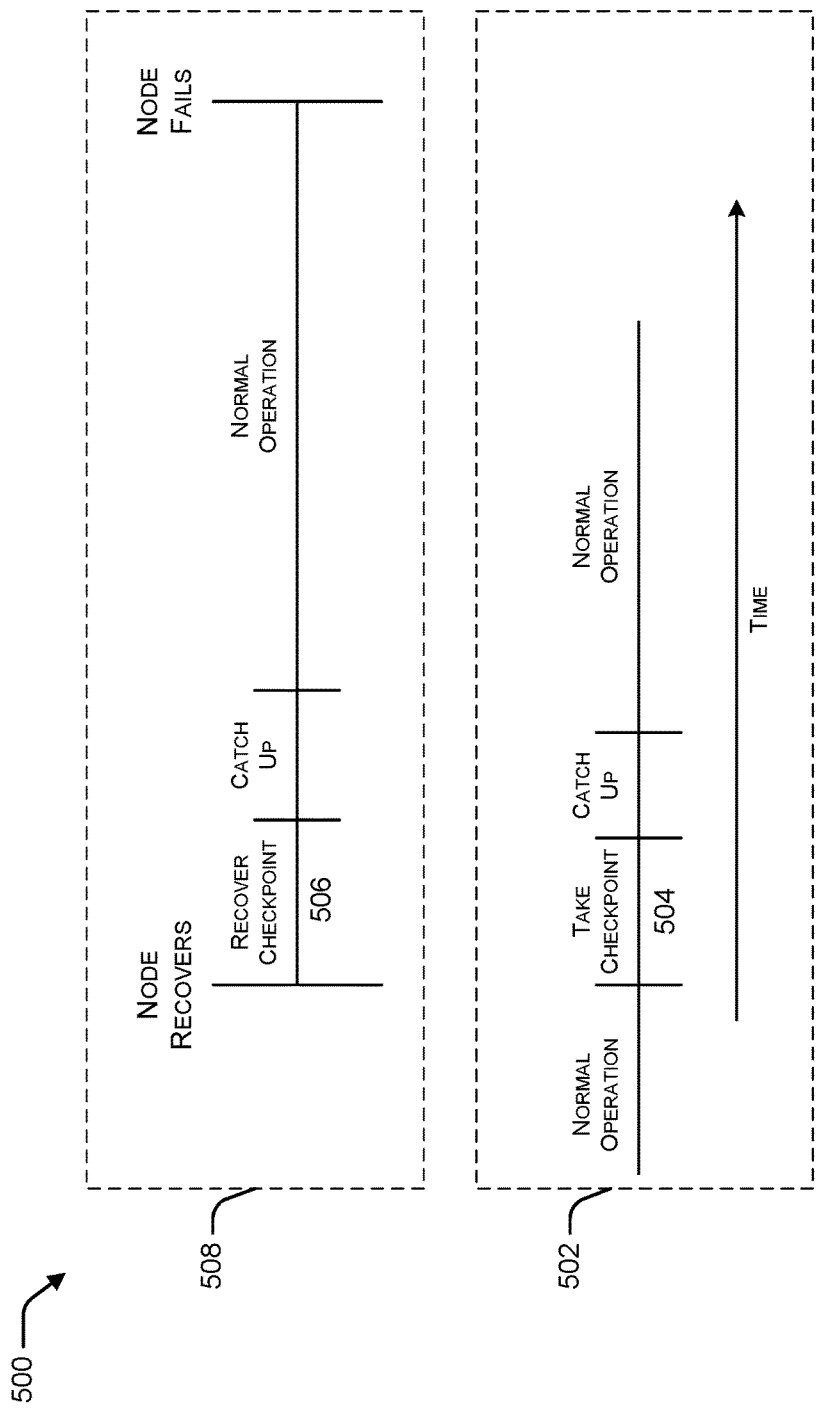
FIG. 5 is a timeline diagram illustrating an example sequence of operations associated with an on-demand checkpointing-based resiliency strategy.

FIG. 5 illustrates an example timeline 500 associated with an on-demand checkpointing-based resiliency strategy. According to on-demand checkpointing, also referred to as active-active checkpointing, multiple copies of the computation are run. When a first compute node fails, another running compute node 502 stops processing input and takes a checkpoint 504, which is used to rehydrate 506 a new running copy 508 to replace the failed node. This approach has various advantages based on the fact that checkpoints are not written to storage, are not produced until needed, and catchup times should be less than in periodic checkpointing because the checkpoint is taken at the time of recovery. On the other hand, an extra node is needed to jump-start a failed node (i.e., when one node goes down, two stop processing input). Accordingly, on-demand checkpointing is not necessarily a better alternative than active-active periodic checkpointing.

For each of the active-active approaches described herein, it is assumed that there is a primary copy, which is responsible for sending output. Part of handling failure is to seamlessly switch primaries from one copy to another. As a result, the cost of output transmission doesn't vary significantly between strategies.

Resiliency Strategy Modeling

As described above, streaming queries are typically run on one or more nodes in a datacenter, and incur various costs. These costs may include, for example, central processing unit (CPU) costs for running, recovering, and checkpointing the query, storage costs for resiliently journaling the input and checkpoints, networking costs to move input and checkpoints, and memory costs associated with maintaining query state. All of these costs are affected by the choice of resiliency strategy, the goal of which is to meet a downtime SLA. A downtime SLA allows the user to specify, for example, a specific number of minutes per year during which the query may be "down." "Down," in this context, means that the query results are not being delivered in as timely a fashion as they would be if node failure did not occur. For example, if a query is catching up after failure and recovery, this is considered downtime until the query has completely caught up to the arriving input.

While all the costs described above are of interest, the NIC bandwidth costs are modeled as a proxy for overall network costs. This choice captures all network activity at the edges, regardless of internal topology, including network capacity to and from storage nodes, compute nodes, and ingress nodes. The model described herein captures the complexity present in modeling other resources and can be varied to capture other resource costs. By considering only networking, some phenomena may be missed. For example, when states are difficult to compute from the input (e.g., high computational complexity), checkpointing approaches are typically favored over replay based approaches. In addition, for some scenarios, memory is a critical cost, which can affect the choice of resiliency strategy. While initially described only with regard to network costs, the models described herein can be made sensitive to these other phenomena, resulting in a more complex, but still tractable, optimization space. In order to compute network cost, the models described herein, use a bandwidth reservation approach.

Figure 6:
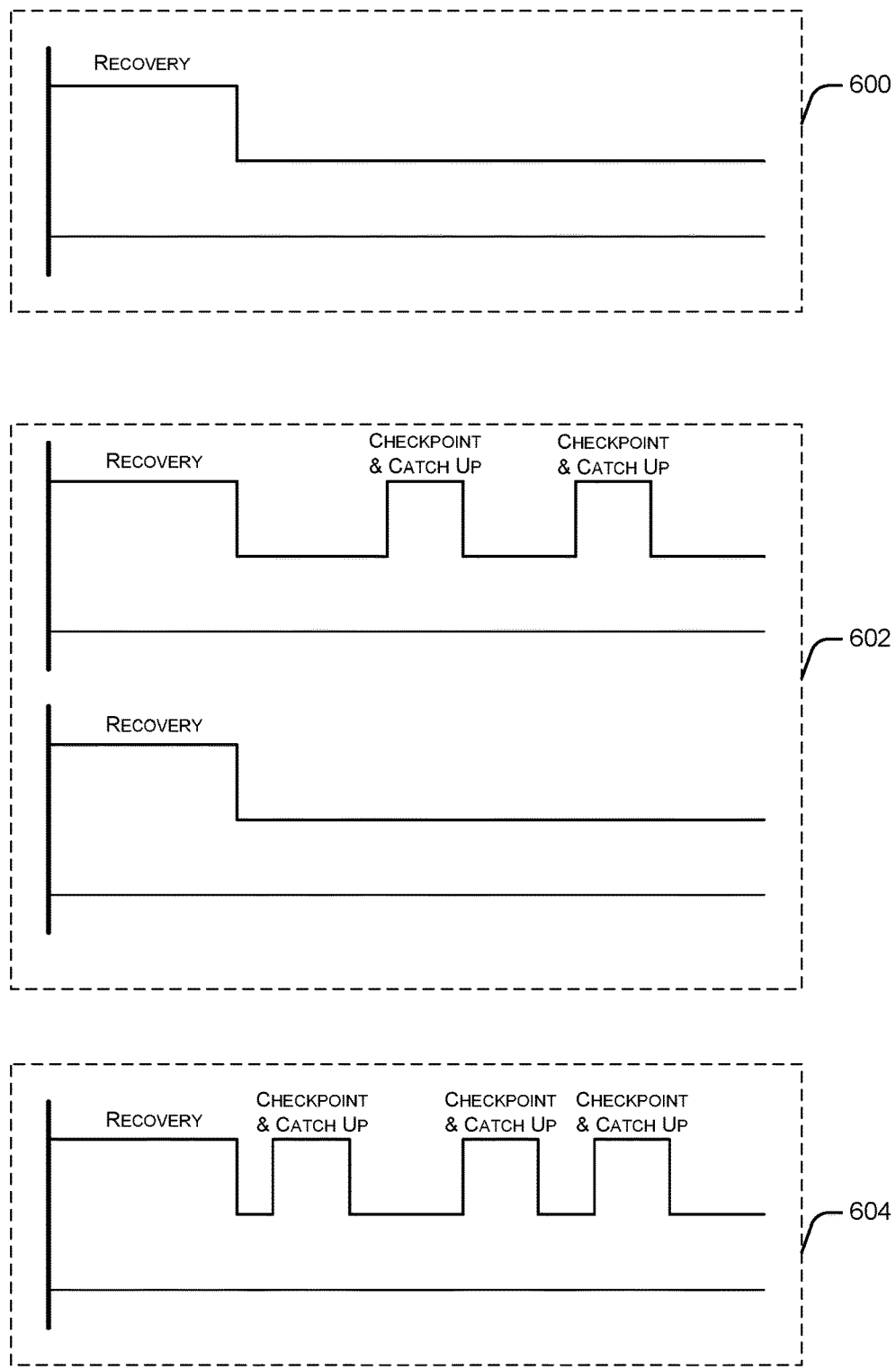
FIG. 6 is a timeline diagram illustrating network load profiles of compute nodes for a replay resiliency strategy, a periodic checkpointing resiliency strategy, and an on-demand checkpointing resiliency strategy.

FIG. 6 illustrates network load profiles of compute nodes for the three resiliency strategies illustrated in, and discussed above with reference to, FIGS. 3-5. As described above, for each of the scenarios illustrated in FIGS. 3-5, each compute node begins its life by recovering a previously failed compute node's state.

For replay resiliency strategies, as represented by network load profile 600, once recovery is complete, the load settles down to the same load that would exist without resiliency. This suggests that there must be enough available bandwidth on the node to recover quickly enough to meet the SLA, but that the bandwidth requirements can be significantly lowered after recovery has completed.

For periodic checkpointing strategies, as represented by network load profile 602, there is one compute node that periodically checkpoints. For the single node version, if enough bandwidth isn't available for either recovery or checkpointing, the SLA will not be met. Therefore, the single node periodic checkpointing strategy must reserve enough capacity to accommodate recovery initially and periodic checkpointing until failure, even though there will be periods of time, after recovery and between checkpoints, where the network load is lower.

It is recognized that for active-active periodic checkpointing, the checkpointing node may fall behind without impacting the SLA, since other nodes, which aren't checkpointing, are always up to date. Rather, the checkpointing node must keep up overall with a constant bandwidth reservation for the average needed bandwidth, but may fall behind for periods of time. Accordingly, the checkpointing node only needs to reserve bandwidth to meet the average, not the peak, load. Some nodes will never need to checkpoint. Accordingly these nodes have load profiles similar to nodes in a replay-based scenario. Therefore, as with the replay-based scenario, for these nodes, the bandwidth reservation can be decreased after recovery is complete.

For on-demand checkpointing-based approaches, as represented by network load profile 604, after recovery is over, any node may, at any time, be used to start a new instance. The load is therefore characterized by sporadic heavy load associated with checkpointing. Since increasing the bandwidth reservation of the checkpointing node could be heavily disruptive to other jobs on the node, resulting in SLA failure for those jobs, the peak checkpointing load needed is continuously reserved to ensure that the SLA is met. Each of the bandwidth reservation strategies described are based on a requirement that bandwidth reservations only decrease (but do not increase) over time.

With this bandwidth reservation approach in mind, the goal of the models described herein is to answer two questions. First, how much bandwidth, compared to input bandwidth, must be reserved initially to recover a failed query? Second, how costly, in terms of reserved NIC bandwidth, is a particular resiliency strategy compared to running the query non-resiliently? Both costs are calculated in comparison to the cost of running the query non-resiliently, as discussed above with reference to FIG. 2. This is an important, if not blatant, facet of the modeling approach described herein.

In order to simplify the analysis, several assumptions are made. First, it is assumed that all network load and other work associated with processing the query non-resiliently is unvarying over time. This assumption is deeply embedded in the approach described herein, and cannot be relaxed without greatly affecting the described models.

Second, it is assumed that the output is small compared to the input. Therefore, the output is not part of the model. This is an assumption made to simplify presentation of the models, and is almost always true for streaming queries. However, output transmission could easily be added to the models, particularly for systems in which the output is more substantial.

Third, it is assumed that failure does not occur during recovery. This is an assumption made to simplify the presentation of the models described herein. In all cases, this is a second order effect, and only has small impact on the resulting costs. This assumption could be relaxed by extending the presented approaches.

The models described herein enable computation of $R_F$ and $C_F$, where $R_F$ represents the recovery NIC bandwidth reservation needed to meet the SLA, as a factor of input bandwidth, and $C_F$ represents the cost, in terms of total reserved NIC bandwidth, as a factor of the NIC costs associated with running the query non-resiliently, as described with reference to FIG. 2. In each of the metrics described herein, the subscript refers to the unit of the metric, where F=factor, T=time, S=size, and R=rate (size/time).

For any given streaming query deployment, models of the various resiliency strategies described herein are based on various combinations of application parameters, infrastructure parameters, and tunable parameters. The application parameters include $I_R$, SLA, $C_S$, and $W_T$. $I_R$ is the input rate, SLA is a fraction of time that the system response to input is unaffected by failure (ratio, e.g., 0.99999), $C_S$ is the checkpoint size, and $W_T$ is the window size, such as 10 minutes in a 10 minute trailing window.

As described above with reference to FIG. 2, the infrastructure parameters include $F_T$, which is the mean time between failure for a single node, and $K_F$, which is the number of copies in replicated storage.

The tunable parameters that, for some resiliency strategies, can be set when optimizing for cost include $C_T$, which is the checkpoint period for periodic checkpointing, and $N_F$, which is the number of running copies. $N_F$ may be explicitly set or may be varied as part of optimizing cost.

Finally, $S_T$, which is the checkpoint transfer time, assuming input rate bandwidth (expressed as a time), is a computed value used throughout the computations described herein. $S_T$ is computed from the parameters described above, such that:

$$S_T = \frac{C_S}{I_R} \qquad (2)$$

Single node replay resiliency strategies include single node replay with data loss and single node replay with no data loss. In single node replay with data loss, lost output is acceptable and the goal of recovery after failure is to minimize downtime. This type of resiliency strategy may be desirable, for example, for dashboard applications, where users are frequently uninterested in previous results. Single node replay with no data loss is desirable, for example, in scenarios where output is logged or where visualizations provide the history of a reported metric.

Single Node Replay with Data Loss

For single node replay with data loss, the goal is to calculate the minimal $R_F$ that meets the specified SLA over an arbitrarily long period of time. In particular, to exactly satisfy the SLA in the long run, each failure is allowed a downtime budget, which, on average, is used to fully recover when the query initially starts after a failure. The downtime budget, $B_T$, is expressed as:

$$B_T = F_T(1-\text{SLA}) \quad (3)$$

To recover after a failure, one window's worth of data is replayed. Accordingly, the recovery time is given as:

$$R_T = \frac{W_T}{R_F} \quad (4)$$

Setting $B_T = R_T$ gives:

$$F_T(1-SLA) = \frac{W_T}{R_F} \quad (5)$$

and solving for $R_F$ gives:

$$R_F = \frac{W_T}{F_T(1-SLA)} \quad (6)$$

Figure 7:
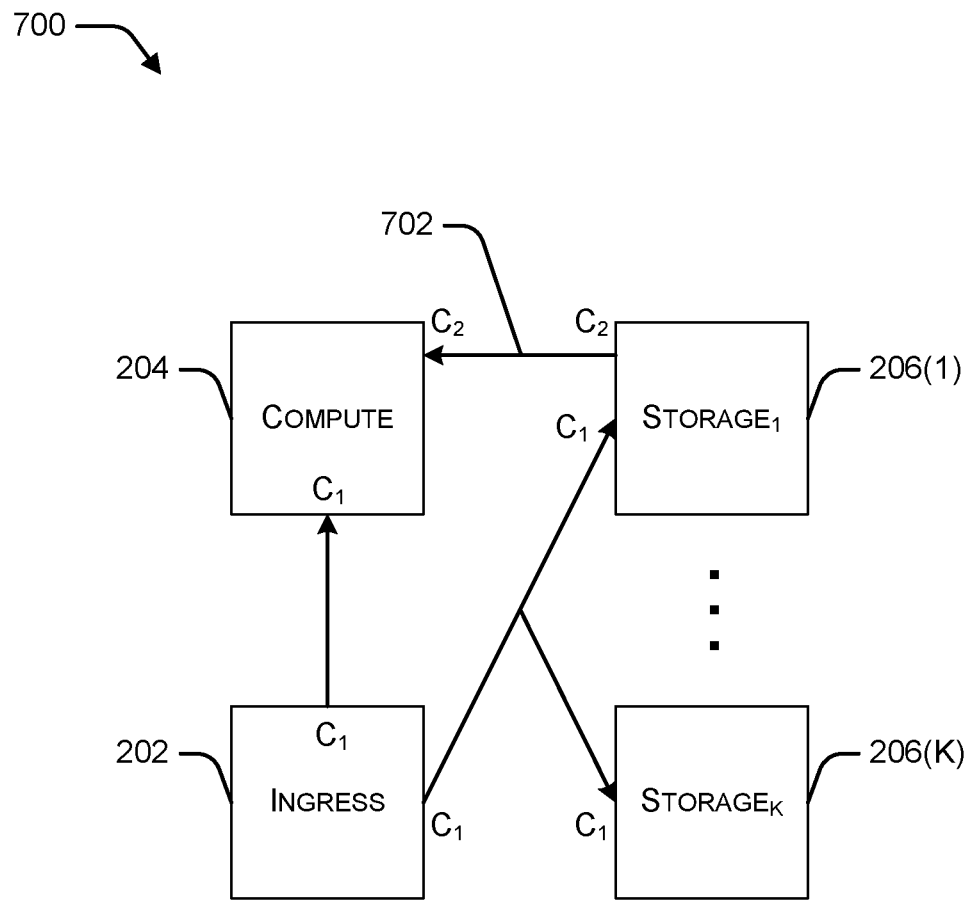
FIG. 7 is a block diagram illustrating an example logical network flow model for a streaming query deployed with a single node replay resiliency strategy.

FIG. 7 illustrates a logical model 700 of a streaming query deployment implemented with a single node replay resiliency strategy. The illustrated streaming query deployment corresponds to the streaming query deployment shown in FIG. 2, including ingress node 202, compute node 204, and storage nodes 206.

As described above, $C_F$ represents the cost to run a streaming query according to a resiliency strategy, as a factor of the cost to run the streaming query with no resiliency. Cost, $C_1$, is the same whether the query is run with or without resiliency. However, when a single node replay strategy is employed, an additional cost, $C_2$, is incurred, which is the cost associated with the replay flow 702. This additional cost is equal to the recovery time ($R_T$) multiplied by the recovery NIC bandwidth reservation needed to meet the SLA, as a factor of input bandwidth ($R_F$), minus the cost of the portion of replay which involved receiving data for the first time from the ingress node ($R_T$). Accordingly:

$$C_2 = R_T \cdot R_F - R_T \quad (7)$$

Summing up all of the costs represented in model 700 gives:

$$C_F = \frac{2(R_T \cdot R_F - R_T) + (K_F + 3) \cdot F_T}{(K_F + 3) \cdot F_T} \quad (8)$$

Single Node Replay with No Data Loss

For single node replay with no data loss, recovery time must start reading input starting from a full window before failure occurred. Once a full window of data has been read, the query will have fallen behind by the time it took to transmit that window's worth of data. Once the query is caught up by that amount, the query will have fallen behind by a small amount, and so on. This scenario is represented by the following infinite series:

$$R_T = \frac{W_T}{R_F} + \frac{W_T}{R_F^2} + \frac{W_T}{R_F^3} + \ldots \quad (9)$$

which can be rewritten as:

$$R_T = W_T \cdot U \cdot \sum_{i=0}^{\infty} U^i, U < 0 \quad (10)$$

where:

$$U = \frac{1}{R_F} \quad (11)$$

Using the closed form for the infinite series gives:

$$R_T = \frac{W_T \cdot U}{(1-U)} = B_T = F_T \cdot (1-SLA) \quad (12)$$

$$U = \frac{F_T \cdot (1-SLA)}{W_T + F_T \cdot (1-SLA)} \quad (13)$$

$$R_F = \frac{W_T + F_T \cdot (1-SLA)}{F_T \cdot (1-SLA)} \quad (14)$$

In calculating the total cost, $C_2$ is the cost of reading a window's worth of data. Accordingly:

$$C_F = \frac{2 \cdot W_T + (K_F + 3) \cdot F_T}{(K_F + 3) \cdot F_T} \quad (15)$$

Active-Active Periodic Checkpointing

Figure 8:
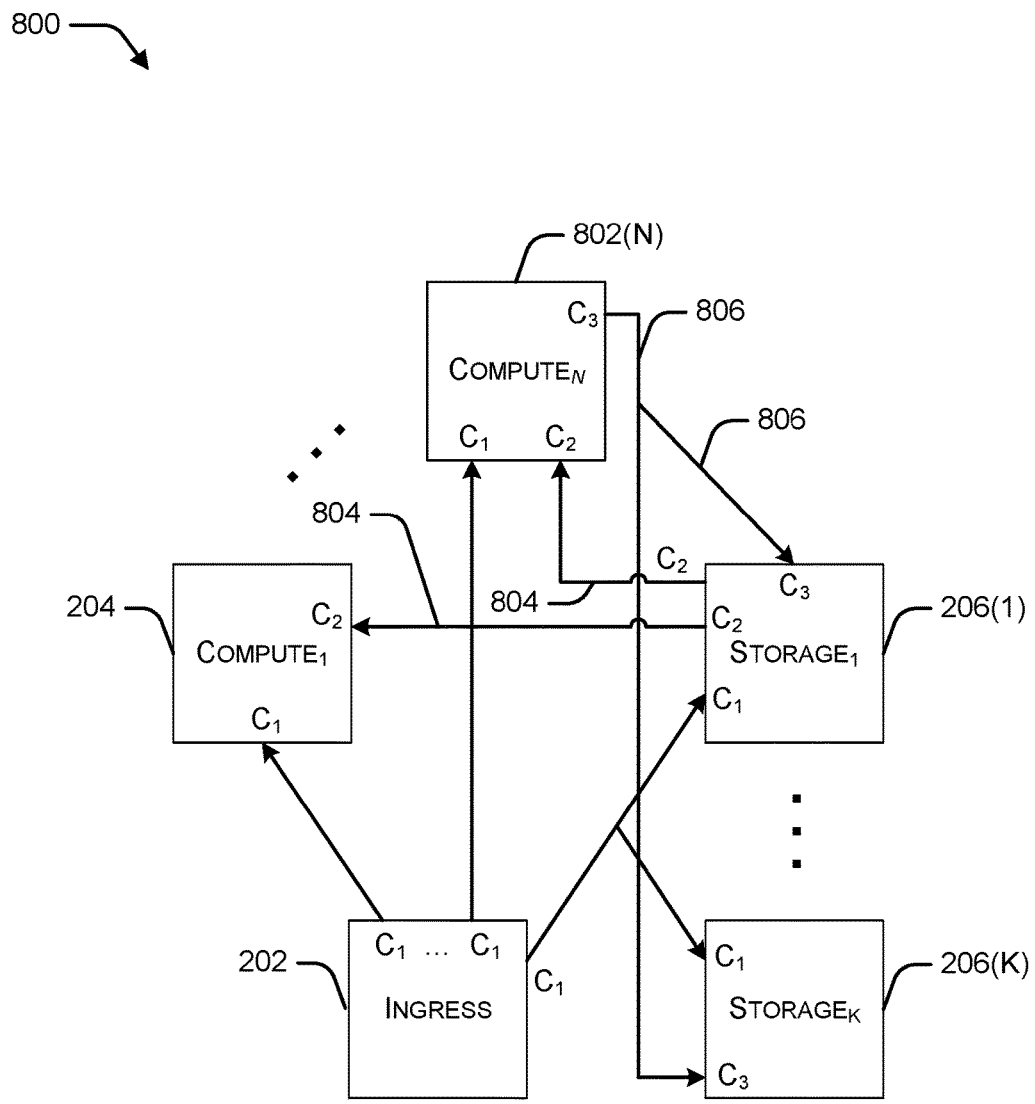
FIG. 8 is a block diagram illustrating an example logical network flow model for a streaming query deployed with an active-active periodic checkpointing resiliency strategy.

FIG. 8 illustrates a logical model 800 of a streaming query deployment implemented with an active-active periodic checkpointing resiliency strategy. The illustrated streaming query deployment corresponds to the streaming query deployment shown in FIG. 2, including ingress node 202, compute node 204, and storage nodes 206. In addition, to support active-active periodic checkpointing, model 800 also includes one or more additional compute nodes, as represented by compute node 802(N). In FIG. 8, $C_1$ represents the same costs as those incurred in the non-resilient case described above with reference to FIG. 2. Additional costs associated with active-active periodic checkpointing are represented in FIG. 8 as $C_2$ and $C_3$. $C_2$ is the cost associated with the recovery flow 804, and $C_3$ represents the network costs of taking a checkpoint, represented by network flows 806.

According to the active-active periodic checkpointing resiliency strategy, multiple compute nodes run copies of the streaming computation, and one of these nodes periodically checkpoints. When one of the compute nodes goes down, recovery from the last successful checkpoint is initiated. As long as at least one running copy remains, there is no downtime. If, however, all copies go down after some time, the remaining recovery time is charged against the SLA budget for that failure.

For nodes in an active-active approach, the distribution for the amount of time it takes for a node to fail is represented by an exponential distribution. The probability density function (PDF) and the cumulative density function (CDF) for $X_i$, represented as $f(t)$ and $F(t)$, respectively, are:

$$f = P(X_i = t) = \lambda e^{-\lambda \lambda t} \qquad (16)$$

$$F(t) = P(X_i \le t) = 1 - e^{-\lambda t} \qquad (17)$$

where $X_i$ represents the time for node i to fail given $$\lambda = \frac{1}{F_T}.$$

Given Y, which represents the time for the k remaining nodes to fail, the PDF and CDF for Y, g(t) and G(t), respectively, are:

$$G(t) = P(Y \le t) = \prod_{i=1}^{k} P(X_i \le t) = (1 - e^{-\lambda t})^k \qquad (18)$$

$$g(t) = \frac{d(G(t))}{dt} = \frac{d((1 - e^{-\lambda t})^k)}{dt} \qquad (19)$$

Each time a node fails, its state must be recovered and the node must be caught up to the latest input. If all other nodes fail before recovery is complete, then the user will experience downtime, which will be charged against the downtime budget. Recovery involves both a fixed size cost, which includes the time to recover the checkpoint, and an input catch up cost, which is twice the time it takes to take a checkpoint (time to take the checkpoint and time to restore the checkpoint), plus an additional variable sized input catch up cost, which depends on how far back the last checkpoint completed.

In a first scenario, failure occurs before the fixed portion of the recovery cost is complete. In a second scenario, failure happens after all fixed recovery costs, but recovery may not complete before total failure occurs. In a third scenario, failure occurs after recovery is complete, so there is no impact on the resiliency budget. In the calculations below, for each of the three scenarios, t is the time until all running nodes fail after one begins recovery.

In the first scenario, in which failure occurs before the fixed portion of the recovery cost is complete:

$$t < U \cdot \left(S_T + \frac{2 \cdot U \cdot S_T}{1 - U}\right) \qquad (20)$$

which includes the time to restore a checkpoint of time length $S_T$, plus the time length of input that arrived while the used checkpoint was taken (i.e., $U \cdot S_T$), plus an equal amount of input that arrived while the checkpoint was restored.

Consider a variable, p, where $0 < p < C_T$, which represents, at the time of initial failure, the amount of time that passed since the last checkpoint completed. For a given t, the budget used is:

$$b1_T(t) = \int_0^{C_T} \frac{U \cdot \left(S_T + (2 \cdot U \cdot S_T + p) \cdot \sum_{i=0}^{\infty} U^i\right) - t}{C_T} dp = \qquad (21)$$

-continued $$\int_0^{C_T} \frac{U \cdot \left(S_T + \frac{2 \cdot U \cdot S_T}{1 - U} + \frac{p}{1 - U}\right) - t}{C_T} dp$$

Note that in the equations above, $U \cdot S_T$ represents the portion of recovery associated with rehydrating the checkpoint, while $U \cdot (2 \cdot U \cdot S_T + p) \cdot \Sigma_{i=0}^{\infty} U^i$ represents the time needed to catch up, depending on how long it's been since the last checkpoint completed. $2 \cdot U \cdot S_T$ represents the time to catch up associated with both taking and restoring the checkpoint.

Integrating over the relevant times for this scenario, the overall impact on the recovery budget is given as:

$$B1_T = \int_0^{U \cdot \left(S_T + \frac{2 \cdot U \cdot S_T}{1 - U}\right)} g(t) \cdot b1_T(t) \cdot dt \qquad (22)$$

In the second scenario, in which failure happens after all fixed recovery costs, but recovery may not complete before total failure occurs:

$$U \cdot \left(S_T + \frac{2 \cdot U \cdot S_T}{1 - U}\right) < t < U \cdot \left(S_T + \frac{2 \cdot U \cdot S_T}{1 - U} + C_T \cdot \sum_{i=0}^{\infty} U^i\right) \qquad (23)$$

or equivalently:

$$U \cdot \left(S_T + \frac{2 \cdot U \cdot S_T}{1 - U}\right) < t < U \cdot S_T + \frac{U \cdot (2 \cdot U \cdot S_T + C_T)}{1 - U} \qquad (24)$$

In this scenario, for each value of t in this range, there are some sub-cases where total failure occurs before catch-up is complete, which incurs a cost against the resiliency budget, but there are also some sub-cases where total failure occurs after catch-up is complete, incurring no penalty. In particular, in the above upper bound, $U \cdot S_T$ represents the time to rehydrate the checkpoint, while the second term, $$\frac{U \cdot (2 \cdot U \cdot S_T + C_T)}{1 - U},$$

represents the portion of the recovery time to catch-up, by as much as $U \cdot (2 \cdot U \cdot S_T + C_T)$ after checkpoint rehydration is complete.

Considering variables $t_p$ and $p_c$, which represent, respectively, how much time was spent on catch up after the fixed portion of the recovery and before total failure, and the amount of variable catch up time needed given a particular value of p:

$$t_p = t - U \cdot \left(S_T + \frac{2 \cdot U \cdot S_T}{1 - U}\right) \qquad (25)$$

and $$p_c = \frac{U \cdot p}{1 - U} \qquad (26)$$

For each time $t_p$, p could range from 0 to $C_T$, resulting in:

$$0 \leq p_c \leq \frac{U \cdot C_T}{1 - U} \quad (27)$$

$t_p = p_c$ represents a scenario in which the new node exactly catches up when the last running node fails, resulting in no downtime. Accordingly, when $t_p < p_c$, there is an additional contribution to the cost of resiliency, which can be calculated according to:

$$B2_T = \int_0^{\frac{U \cdot C_T}{1-U}} x \cdot P(X = x) dx \quad (28)$$

where $x = p_c - t_p$. It is assumed that when failure occurs, there is a uniform probability distribution (between 0 and $C_T$) for how far back the last checkpoint completed. Accordingly:

$$P(X = x) = \int_{t_p=0}^{\frac{U \cdot C_T}{1-U} - x} g\left(t_p + U \cdot \left(S_T + \frac{2 \cdot U \cdot S_T}{1-U}\right)\right) \cdot \left(\frac{1}{\left(\frac{U \cdot C_T}{1-U}\right)}\right) dt_p = \quad (29)$$

$$\int_{t_p=0}^{\frac{U \cdot C_T}{1-U} - x} \left(\frac{g\left(t_p + U \cdot \left(S_T + \frac{2 \cdot U \cdot S_T}{1-U}\right)\right) \cdot (1 - U)}{U \cdot C_T}\right) dt_p$$

Accordingly, the overall contribution of this scenario to the resiliency budget is given by:

$$B2_T = \int_0^{\frac{U \cdot C_T}{1-U}} x \cdot \left(\int_{t_p=0}^{\frac{U \cdot C_T}{1-U} - x} \left(\frac{g\left(t_p + U \cdot \left(S_T + \frac{2 \cdot U \cdot S_T}{1-U}\right)\right) \cdot (1 - U)}{U \cdot C_T}\right) dt_p\right) \cdot d_x \quad (30)$$

In the third scenario, in which failure occurs after recovery is complete, there is no impact on the resiliency budget. Accordingly:

$$B3_T = 0 \quad (31)$$

Taking the three possible scenarios into account, the overall resiliency cost per failure is:

$$B_T = B1_T + B2_T + B3_T \quad (32)$$

The goal is to solve for U in:

$$(1 - SLA) \cdot \frac{F_T}{N_F} = B_T \quad (33)$$

While, at times, it is possible to solve for U analytically, in general, for the models described herein, a numerical approach is used. For example, in this case, the first step is to find the zero for:

$$F(U) = B_T - (1 - SLA) \cdot \frac{F_T}{N_F} \quad (34)$$

Because F(U) is monotonically increasing, $0 < U < 1$, $F(0) < 0$, and $f(1)$ is an asymptote at infinity, a binary search between 0 and 1 avoids any potential instability issues in a technique like Newton's method. After determining U, $R_F$ is given by:

$$R_F = \frac{1}{U} \quad (35)$$

As described above, in FIG. 8, $C_1$ represents the same costs as those incurred in the non-resilient case described above with reference to FIG. 2. However, due to the active-active nature of this resiliency strategy, there are additional network flows that also incur the cost represented by $C_1$. The total of the $C_1$ costs illustrated in FIG. 8 is represented by:

$$(K_F + 1 + 2 \cdot N_F) \cdot F_T \quad (36)$$

As described above, $C_2$ is the cost associated with the recovery flow 808, which occurs, on average, $N_F$ times during $F_T$. The recovery flow consists of sending and receiving a checkpoint, followed by catching up to the point of failure by replaying the stored input. The expected time since the last checkpoint is $C_T/2$. Accordingly, the total costs associated with $C_2$ are represented as:

$$N_F \cdot \left(2 \cdot \left(S_T + \frac{C_T}{2}\right)\right) \quad (37)$$

As described above, $C_3$ represents the network costs of taking a checkpoint, represented by network flows 810. As with $C_2$, $C_3$ involves sending and receiving checkpoints, except that there is no replay component. Checkpoints are taken $F_T/C_T$ times during the failure interval, and is sent to $K_F$ storage nodes, leading to a cost of:

$$\frac{(K_F + 1) \cdot S_T \cdot F_T}{C_T} \quad (38)$$

Summing the values represented in equations 36-38, leads to the following:

$$C_F = \frac{(K_F + 1 + 2 \cdot N_F) \cdot F_T + N_F \cdot 2 \cdot \left(S_T + \frac{C_T}{2}\right) + \frac{(K_F + 1) \cdot S_T \cdot F_T}{C_T}}{(K_F + 3) \cdot F_T} \quad (39)$$

Two Node On-Demand Checkpointing

Figure 9:
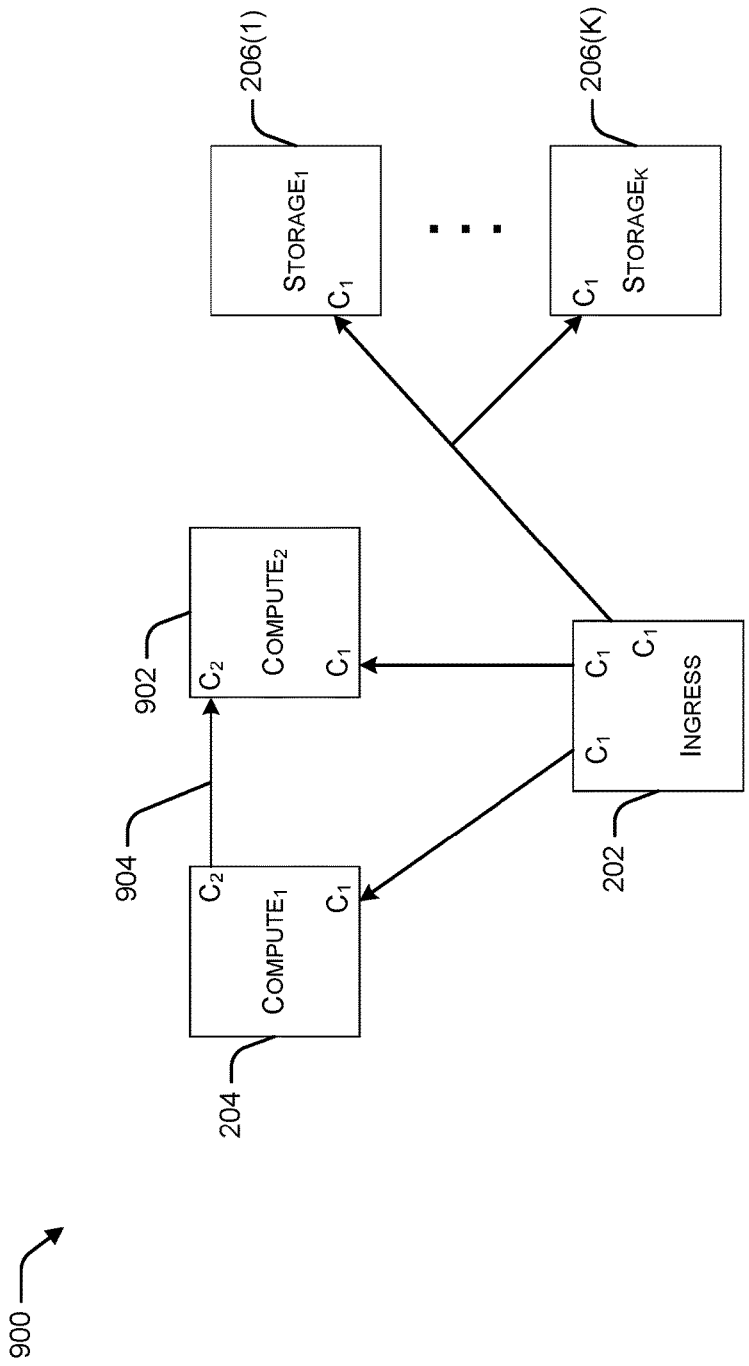
FIG. 9 is a block diagram illustrating an example logical network flow model for a streaming query deployed with a two node on-demand checkpointing resiliency strategy.

FIG. 9 illustrates a logical model 900 of a streaming query deployment implemented with a two node on-demand checkpointing resiliency strategy. The illustrated streaming query deployment corresponds to the streaming query deployment shown in FIG. 2, including ingress node 202, compute node 204, and storage nodes 206. In addition, to support on-demand checkpointing, model 900 also includes an second compute node 902. In FIG. 9, $C_1$ represents the same costs as those incurred in the non-resilient case described above with reference to FIG. 2. Additional costs associated with two node on-demand checkpointing, i.e., the cost of using either compute node to recover the other, is represented in FIG. 9 as $C_2$, which corresponds to network flow 904.

In two node on-demand checkpointing, there are always two running copies of the query (i.e., on compute nodes 204 and 902). When one compute node goes down, the other takes a checkpoint, which is transmitted and rehydrated, in pipelined fashion, to a new node. Once rehydration is complete, both nodes catch up to the latest input.

Similar to single node checkpointing, since all progress stops when failure occurs, the full recovery time is charged to the SLA budget. The recovery time is determined as:

$$R_T = U \cdot \left(S_T + \frac{U \cdot S_T}{1-U}\right) \quad (40)$$

The entire recovery time is charged against the SLA budget, so $B_T = R_T$. Accordingly, because there are two nodes, both of which fail:

$$(1 - SLA) \cdot \frac{F_T}{2} = U \cdot \left(S_T + \frac{U \cdot S_T}{1-U}\right) \quad (41)$$

Solving for U analytically is challenging, so as in other cases, a binary search is used to find the zero for:

$$F(U) = U \cdot \left(S_T + \frac{U \cdot S_T}{1-U}\right) - (1 - SLA) \cdot \frac{F_T}{2} \quad (42)$$

Upon determining U, it follows that:

$$R_F = \frac{1}{U} \quad (43)$$

To compute $C_F$, the NIC load on the two compute nodes 204 and 902 is first considered. Based on the condition that bandwidth reservations may not be increased over time, and the fact that either node may be used to recover the other at any time, bandwidth load of $R_F$ is continuously reserved. Accordingly, the bandwidth for each compute node is represented by:

$$C_1 + C_2 = R_F \cdot F_T \quad (44)$$

The remaining costs, which are all $C_1$, total:

$$(K_F + 3) \cdot C_1 = (K_F + 3) \cdot F_T \quad (45)$$

Therefore:

$$C_F = \frac{(K_F + 3) \cdot F_T + 2 \cdot R_F \cdot F_T}{(K_F + 3) \cdot F_T} \quad (46)$$

Active-Active Replay

Figure 10:
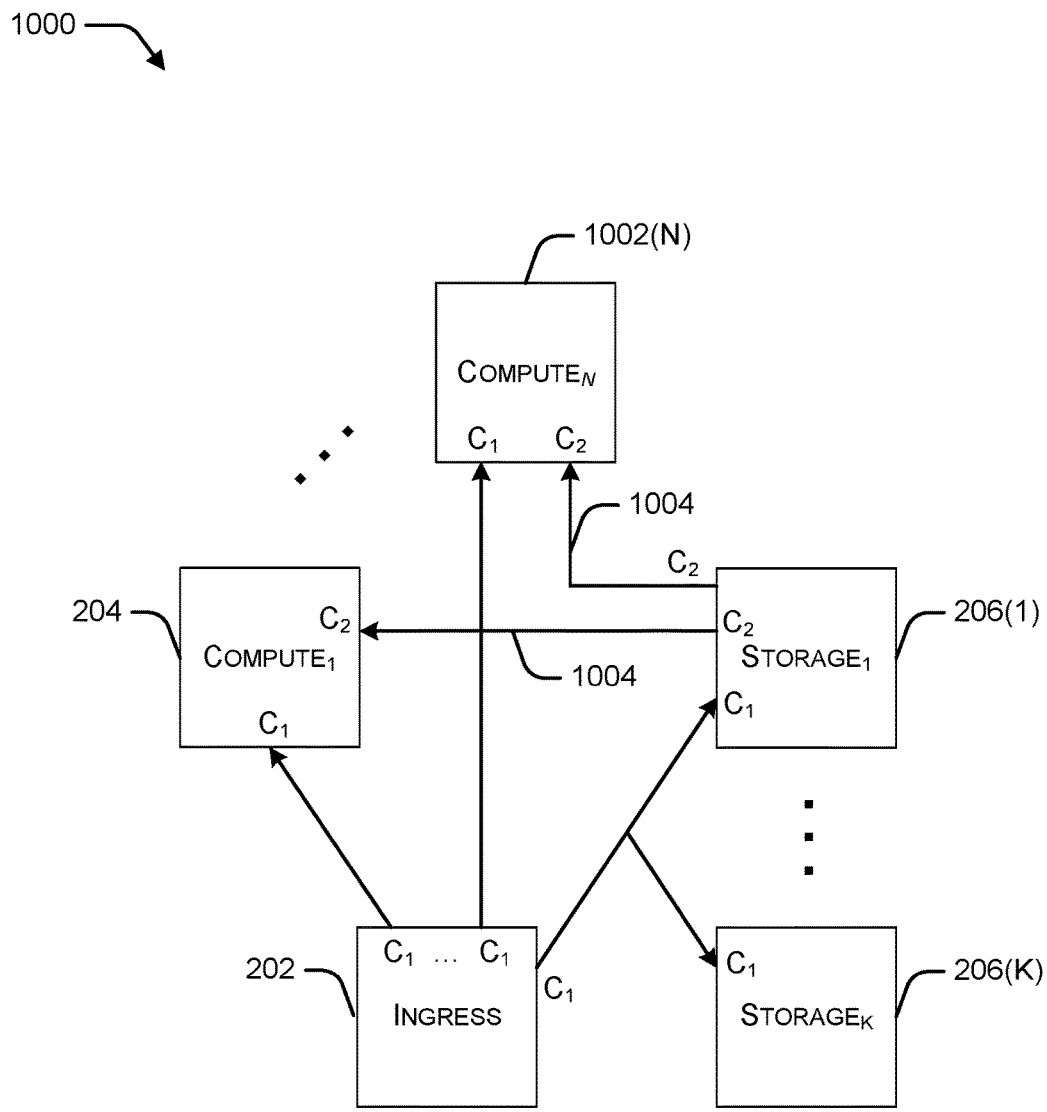
FIG. 10 is a block diagram illustrating an example logical network flow model for a streaming query deployed with an active-active replay resiliency strategy.

FIG. 10 illustrates a logical model 1000 of a streaming query deployment implemented with an active-active replay resiliency strategy. The illustrated streaming query deployment corresponds to the streaming query deployment shown in FIG. 2, including ingress node 202, compute node 204, and storage nodes 206. In addition, to support active-active replay, model 1000 also includes one or more additional compute nodes, as represented by compute node 1002(N). In FIG. 10, $C_1$ represents the same costs as those incurred in the non-resilient case described above with reference to FIG. 2. Additional costs associated with active-active replay are represented in FIG. 10 as $C_2$, which is the cost associated with the recovery flow 1004.

According to an active-active replay resiliency strategy, each time a compute node fails, its state must be recovered by replaying a window of data. If all other compute nodes fail before the first failed compute node recovers, then the user will experience downtime, which will be charged against the downtime budget.

The following calculations assume output may be lost during downtime, similar to the assumption above for single node replay with data loss. Although not illustrated herein, as with single node replay with no data loss, similar calculations could be performed to model an active-active replay resiliency strategy that would not allow any data loss.

Using the recovery time, $R_T$, and the function g(t) given above (see equation (19)), for any number of replicas, the expected time charged per failure against the SLA, given as $B_T$, can be represented as:

$$B_T = \int_0^{R_T}(R_T - t) \cdot g(t)dt \quad (47)$$

As discussed above, when using a replay resiliency strategy, and the window size is $W_T$:

$$R_T = W_T U \quad (48)$$

Therefore:

$$B_T = \int_0^{R_T}(W_T \cdot U - t) \cdot g(t)dt \quad (49)$$

Similar to active-active periodic checkpointing, the goal is to solve for U in:

$$(1 - SLA) \cdot \frac{F_T}{N_F} = B_T \quad (50)$$

Similarly, another goal is to find the zero for:

$$F(U) = B_T - (1 - SLA) \cdot \frac{F_T}{N_F} \quad (51)$$

In an example, a numerical technique is used to solve for U. This becomes particularly important when $N_F > 2$, which makes solving directly for U very challenging. Unlike the periodic checkpointing scenario, there is no asymptote at 1, although ƒ(U) is still monotonically increasing and guaranteed to be negative at 0. Therefore, it is still possible to solve for U by performing a binary search in the range between 0 and 1. If the active-active replay strategy allows for some data loss, a very permissive SLA may allow for an $R_F$ greater than 1. However, in the models described herein, $R_F$ is defined to have an upper bound of 1.

It is further noted that this approach may be generalized to any number of active compute nodes. However, with a greater number of compute nodes, a tool such as Mathematical is useful to derive $B_T$. After solving for U, $R_F$ can be computed according to:

$$R_F = \frac{1}{U} \quad (52)$$

Referring back to FIG. 10, cost $C_1$ is the same as in active-active periodic checkpointing. That is:

$$C_1 = (K_F + 1 + 2 \cdot N_F) \cdot F_T \quad (53)$$

Furthermore, the replay costs, represented as $C_2$, are similar to the costs associated with single node replay, except that replay is more common, occurring $N_F$ times every $F_T$. Accordingly:

$$C_2 = 2 \cdot N_F \cdot (R_T \cdot R_F - R_T) \quad (54)$$

Therefore, based on $C_1$ and $C_2$:

$$C_F = \frac{(K_F + 1 + 2 \cdot N_F) \cdot F_T + 2 \cdot N_F \cdot (R_T \cdot R_F - R_T)}{(K_F + 3) \cdot F_T} \quad (55)$$

Single Node Periodic Checkpointing

Figure 11:
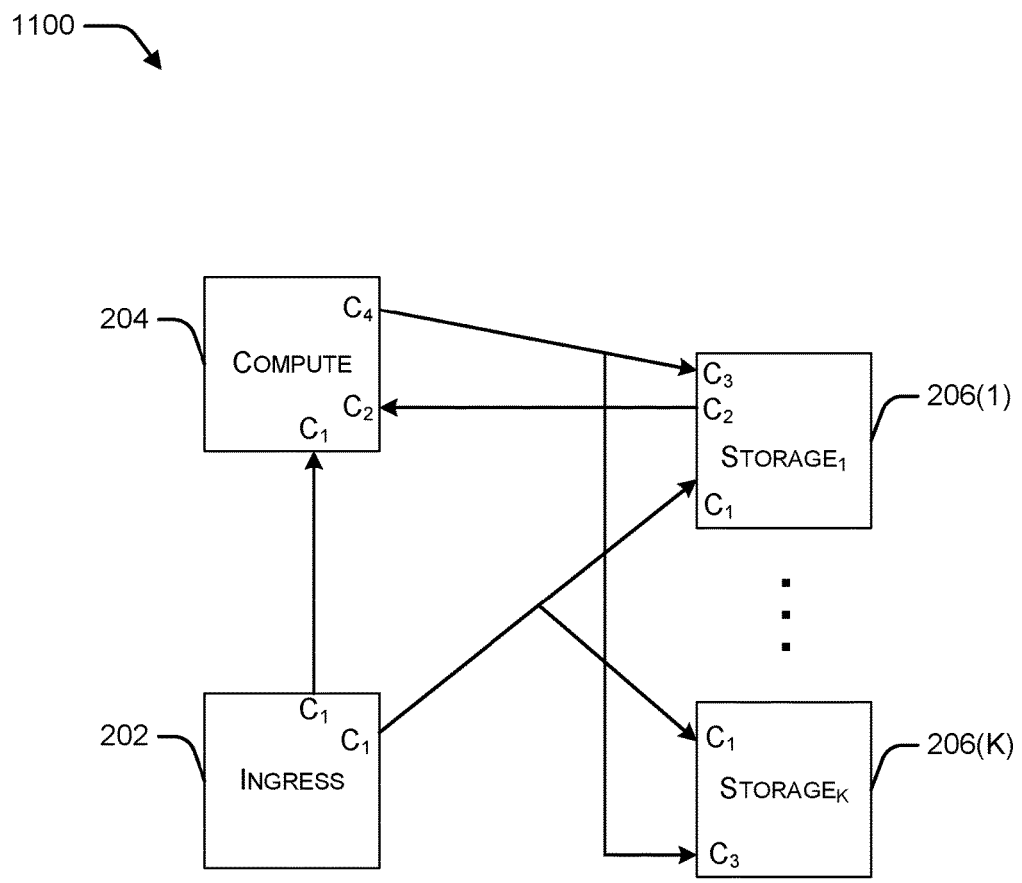
FIG. 11 is a block diagram illustrating an example logical network flow model for a streaming query deployed with a single node periodic checkpointing resiliency strategy.

FIG. 11 illustrates a logical model 1100 of a streaming query deployment implemented with a single node periodic checkpointing resiliency strategy. The illustrated streaming query deployment corresponds to the streaming query deployment shown in FIG. 2, including ingress node 202, compute node 204, and storage nodes 206. In this resiliency approach, checkpoints are taken periodically. Both the downtime experienced during checkpointing, as well as the downtime experienced during recovery are charged against the downtime budget. In FIG. 11, $C_1$ represents the same costs as those incurred in the non-resilient case described above with reference to FIG. 2. Additional costs associated with single node periodic checkpointing are represented in FIG. 11 as $C_2$, which is the cost associated with recovery, $C_3$, which is the cost of checkpointing, and $C_4$, which is the reserved bandwidth on the compute node. $C_3$ may be smaller than $C_4$ due to the fact that bandwidth reservations on the compute node may be greater than what is needed to transfer the data between the compute node and the storage node, while the bandwidth at the storage node is based on the actual data being transferred.

Considering first the downtime experienced during checkpointing, during a time period between failures, $$\frac{F_T}{C_T}$$

checkpoints are taken, each of which takes $S_T$ time units to transfer over the network, assuming input rate bandwidth. In addition, there is a catch up period after each checkpoint is taken, which is the time it takes for the output to be produced in as timely a fashion as if a checkpoint had never been taken. The amount of time it takes for the checkpoint to be transferred is $U \cdot S_T$.

The catch up time is a bit more complicated. During the time it took to take the checkpoint, the input fell behind by $U \cdot S_T$ time units. It takes $U \cdot U \cdot S_T$ time to replay this input, at the end of which, the compute node is behind by $U \cdot U \cdot U \cdot S_T$ time units. In other words, the catch up time can be expressed with the following geometric series:

$$U \cdot U \cdot S_T \cdot \Sigma_{i=0}^{\infty} U^i \quad (56)$$

Catch up only occurs if U<1. Accordingly, the closed form for the series can be used, and the downtime cost of checkpointing for each failure period, $B1_T$, can be written as:

$$B1_T = U \cdot \left(S_T + \frac{U \cdot S_T}{1 - U}\right) \cdot \frac{F_T}{C_T} \quad (57)$$

In calculating downtime associated with recovery, there are also two phases to consider: a checkpoint recovery period and a catch up period. The checkpoint recovery period is a fixed amount of time, but the catch up period depends on how much time as passed since the last checkpoint was taken, represented as t. The time to recover the checkpoint is known to be $U \cdot S_T$. If t=0, the total amount of input which needs to be replayed for catch up is the time it took to transfer the checkpoint when it was taken, plus the time it took to recover the checkpoint after failure. Thus the total amount of fixed input time which needs to be recovered is $2 \cdot U \cdot S_T$. The infinite sum is still an issue as replay occurs, so the total budget used for the fixed replay cost is $$\frac{2 \cdot U \cdot U \cdot S_T}{1 - U}.$$

In addition, there is a variable replay amount, t, which varies from 0 to $C_T$. Using an expected value calculation for t results in the following representation of the total replay cost:

$$B2Replay_T = U \cdot \left(\frac{2 \cdot U \cdot S_T}{1 - U} + \frac{\int_0^{C_T} t \cdot dt}{(1 - U) \cdot C_T}\right) \quad (58)$$

Accordingly, the total recovery cost $B2_T$, which includes the cost of restoring the checkpoint and the cost of replay, is:

$$B2_T = U \cdot \left(S_T + \frac{2 \cdot U \cdot S_T}{1 - U} + \frac{\int_0^{C_T} t \cdot dt}{(1 - U) \cdot C_T}\right) \quad (59)$$

The total cost per failure, $B_T$, is therefore:

$$B_T = B1_T + B2_T = \quad (60)$$

$$U \cdot \left(S_T + \frac{U \cdot S_T}{1 - U}\right) \cdot \frac{F_T}{C_T} + U \cdot \left(S_T + \frac{2 \cdot U \cdot S_T}{1 - U} + \frac{\int_0^{C_T} t \cdot dt}{(1 - U) \cdot C_T}\right)$$

Maximizing U is equivalent to solving for U when the recovery budget per failure equals the maximum allowable downtime per failure. This can be expressed as:

$$(1 - SLA) \cdot F_T = B_T \quad (61)$$

A binary search between 0 and 1 can then be used to find the zero for:

$$F(U) = B_T - (1 - SLA) \cdot F_T \quad (62)$$

After determining U, $R_F$ is given by:

$$R_F = \frac{1}{U} \quad (63)$$

As discussed above, FIG. 11 provides the model to calculate $C_F$. $C_1$ is the same as in calculating the baseline cost, as described above with reference to FIG. 2:

$$C_1 = (K+3) \cdot F_T \quad (64)$$

As described above, $C_2$ represents the network costs associated recovery. $C_2$ includes the cost of sending or receiving a checkpointing, and sending or receiving, on average, half of the checkpointing period. Accordingly:

$$C_2 = S_T + \frac{C_T}{2} \quad (65)$$

As described above, $C_3$ represents the actual cost of checkpointing, which, similar to active-active checkpointing, is represented as:

$$C_3 = \frac{S_T \cdot F_T}{C_T} \quad (66)$$

As described above, $C_4$ is not necessarily equal to $C_3$. That is:

$$C_4 = R_F \cdot (F_T - R_T) \quad (67)$$

Summing the costs represented by $C_1$, $C_2$, $C_3$, and $C_4$ gives:

$$C_F = \frac{(K_F + 3) \cdot F_T + (C_4 + C_2) + C_2 + K_F \cdot C_3}{(K_F + 3) \cdot F_T} = \frac{(K_F + 3 + R_F) \cdot F_T + S_T + \frac{C_T}{2} + \frac{K_F \cdot S_T \cdot F_T}{C_T}}{(K_F + 3) \cdot F_T} \quad (68)$$

Active-Active On-Demand Checkpointing

Figure 12:
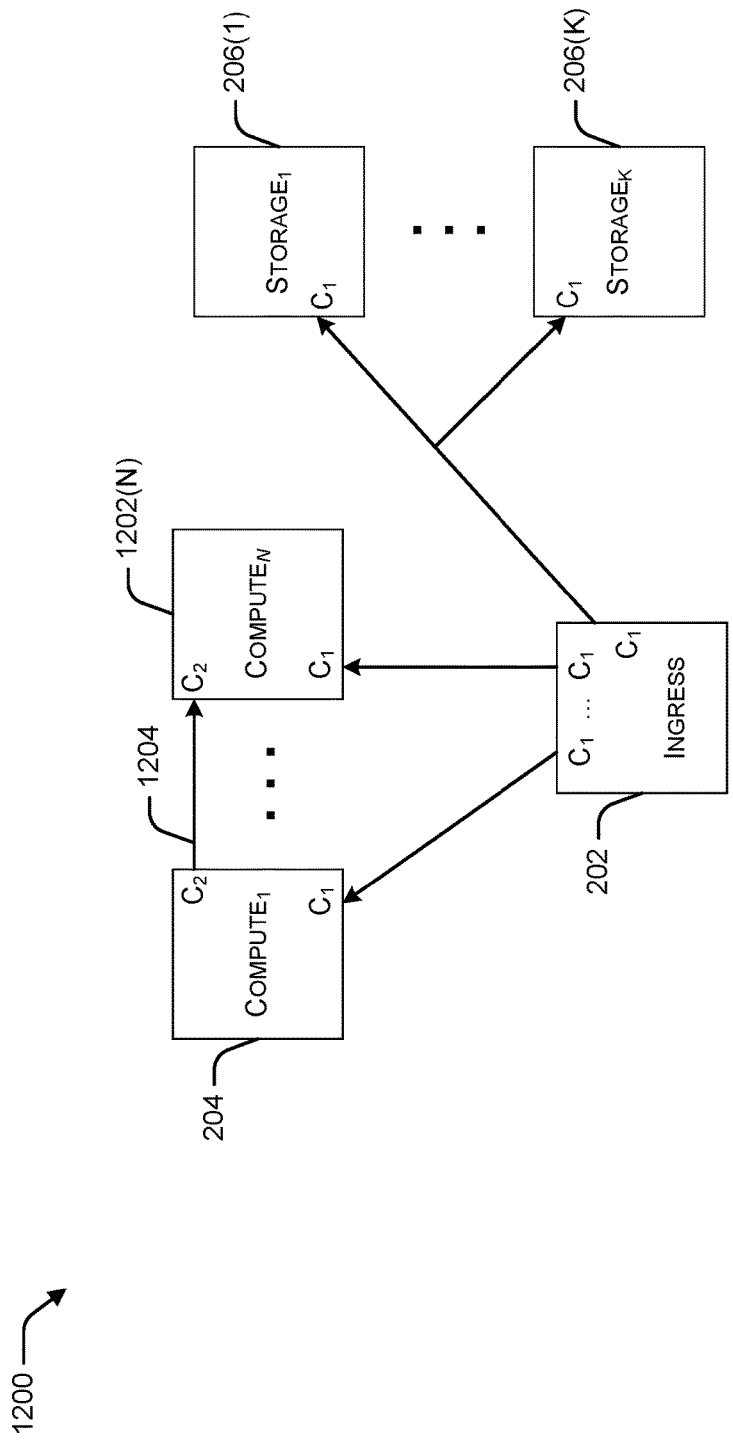
FIG. 12 is a block diagram illustrating an example logical network flow model for a streaming query deployed with an active-active on-demand checkpointing resiliency strategy.

FIG. 12 illustrates a logical model 1200 of a streaming query deployment implemented with an active-active on-demand checkpointing resiliency strategy. The illustrated streaming query deployment corresponds to the streaming query deployment shown in FIG. 2, including ingress node 202, compute node 204, and storage nodes 206. In addition, to support active-active on-demand checkpointing, model 1200 also includes one or more additional compute nodes, as represented by compute node 1202(N).

Active-active on-demand checkpointing is similar to two node on-demand checkpointing. According to an active-active on-demand checkpointing resiliency strategy, during normal operation, the query is redundantly executed N times, modeled as N compute nodes. When one of the compute nodes fails, one of the remaining running compute nodes is used to recover the failed node. The result is reduced recovery time, compared to periodic checkpointing. However, unlike periodic checkpointing, when one node fails, a second node also goes down while it is used to recover the failed node. This increases the likelihood that all running node will fail before recovery of the first failed node is complete.

According to an active-active on-demand checkpointing resiliency strategy, when a node fails, another node takes a checkpoint, and sends the checkpoint to the new node, which rehydrates the checkpoint. Since the operations can be pipelined, the time taken to simultaneously transfer and receive the checkpoint is $U \cdot S_T$. During this time, both nodes will fall behind and will need to catch up. As a result, the total amount of recovery time is:

$$R_T = U \cdot \left( S_T + \frac{U \cdot S_T}{1 - U} \right) \quad (69)$$

Similar to active-active with replay, given the recovery time, the impact on the resiliency budget is:

$$B_T = \int_0^{U \cdot \left( S_T + \frac{U \cdot S_T}{1 - U} \right)} g(t) \cdot \left( U \cdot \left( S_T + \frac{U \cdot S_T}{1 - U} \right) - t \right) \cdot dt \quad (70)$$

A difference in this approach is that the function g(t) is calculated based on N−2 nodes that must all fail instead of N−1, as used in other active-active approaches. As with other resiliency strategies described above, U may be numerically calculated, and $$R_F = \frac{1}{U} \quad (71)$$

In FIG. 12, $C_1$ represents the same costs as those incurred in the non-resilient case described above with reference to FIG. 2. Additional costs associated with active-active on-demand checkpointing are represented in FIG. 12 as $C_2$. Additional costs associated with active-active on-demand checkpointing, i.e., the cost of using any compute node to recover another, is represented in FIG. 12 as $C_2$, which corresponds to network flow 1204. As in two node on-demand checkpointing, for each compute node:

$$C_1 + C_2 = R_F \cdot F_T \quad (72)$$

The remaining costs, which are all $C_1$, total:

$$(K_F + 1 + N_F) \cdot C_1 = (K_F + 1 + N_F) \cdot F_T \quad (73)$$

Therefore:

$$C_F = \frac{(K_F + 1 + N_F) \cdot F_T + N_F \cdot R_F \cdot F_T}{(K_F + 3) \cdot F_T} \quad (74)$$

Numerical Approaches for Computing $R_F$

For each of the resiliency strategies described above, except single node replay, $R_F$ is computed by finding the zero for some F(U), where $$U = \frac{1}{R_F}.$$

More specifically, these function have the form:

$$F(U) = C(U) - B_{SLA} \quad (75)$$

Where C(U) is the resiliency cost as a function of U, and $B_{SLA}$ is the allotted downtime budget for a particular SLA.

For each checkpointing-based resiliency strategy, C(U)=0 when U=0, because if there is infinite bandwidth, no down-time budget is ever used to checkpoint or recover. Similarly, C(U)=∞ when U=1, because without extra budget, catchup is not possible. Furthermore, C(U) increases monotonically with U because more bandwidth means less resiliency cost.

Based on these properties, it is possible to perform a binary search for the zero in F(U) without running into stability issues.

For the replay-based resiliency strategies that allow some data loss, there is no asymptote at U=1. For example, consider a scenario in which the resiliency budget is so lax that even if the current input is replayed at the time the node comes up, there is still unused resiliency budget. In this scenario, the bandwidth reservation could be lower than the input rate. In this case, C(U) approaches infinity as U approaches infinity. Accordingly, a binary search may be performed after finding a value of U such that F(U)>0. Finding such a value for U is not difficult given that C(U) and F(U) both monotonically increase with U.

Optimizing CF

For both single node and active-active periodic checkpointing, computing $C_F$ includes determining a checkpointing frequency, $C_T$, which optimizes $C_F$. The function for $C_F$ for single node periodic checkpointing is given above as Equation (68) and the function for $C_F$ for active-active periodic checkpointing is given above as Equation (39). Rewriting Equation (68) and Equation (39) in terms of values that depend on $C_T$ gives, respectively:

$$C_F = a_1 + a_2 R_F + a_3 C_T + \frac{a_4}{C_T} \quad (76)$$

and $$C_F = b_1 + b_2 C_T + \frac{b_3}{C_T} \quad (77)$$

where $a_1 \ldots a_4$, $b_1 \ldots b_3$ are positive constants.

Considering active-active periodic checkpointing, the curve represented by Equation (76) has a single minimum, which is approached, as $C_T$ increases, for as long as $$\frac{b_3}{C_T}$$

reduces faster than $b_2 C_T$ increases. Such minima can easily be found using an approach similar to binary search, over a region that is known to contain the minima, by sampling two equidistant points in the middle, and removes either the leftmost third or the rightmost third, ensuring that the remaining region still contains the minimum.

Considering single node periodic checkpointing, the shape of $R_F$ as a function of $C_T$ is similar to that described above with regard to active-active periodic checkpointing. Initially, there is significant savings in transmitting checkpoints less frequently. Eventually, though, the added cost of replay dominates the benefit of infrequent checkpointing, leading to an optimal setting for $C_T$. $C_F$, for this case, ends up being the sum of two functions with monotonically increasing derivative, where both derivatives start negative and become positive. As a result, there can be only one point where the sum of these two derivatives equals zero, where the minimum cost occurs. As a result, the overall shape of the cost function is similar to that described above for active-active periodic checkpointing, and thus, the same technique may be used for optimizing cost.

Example Computing Device

Figure 13:
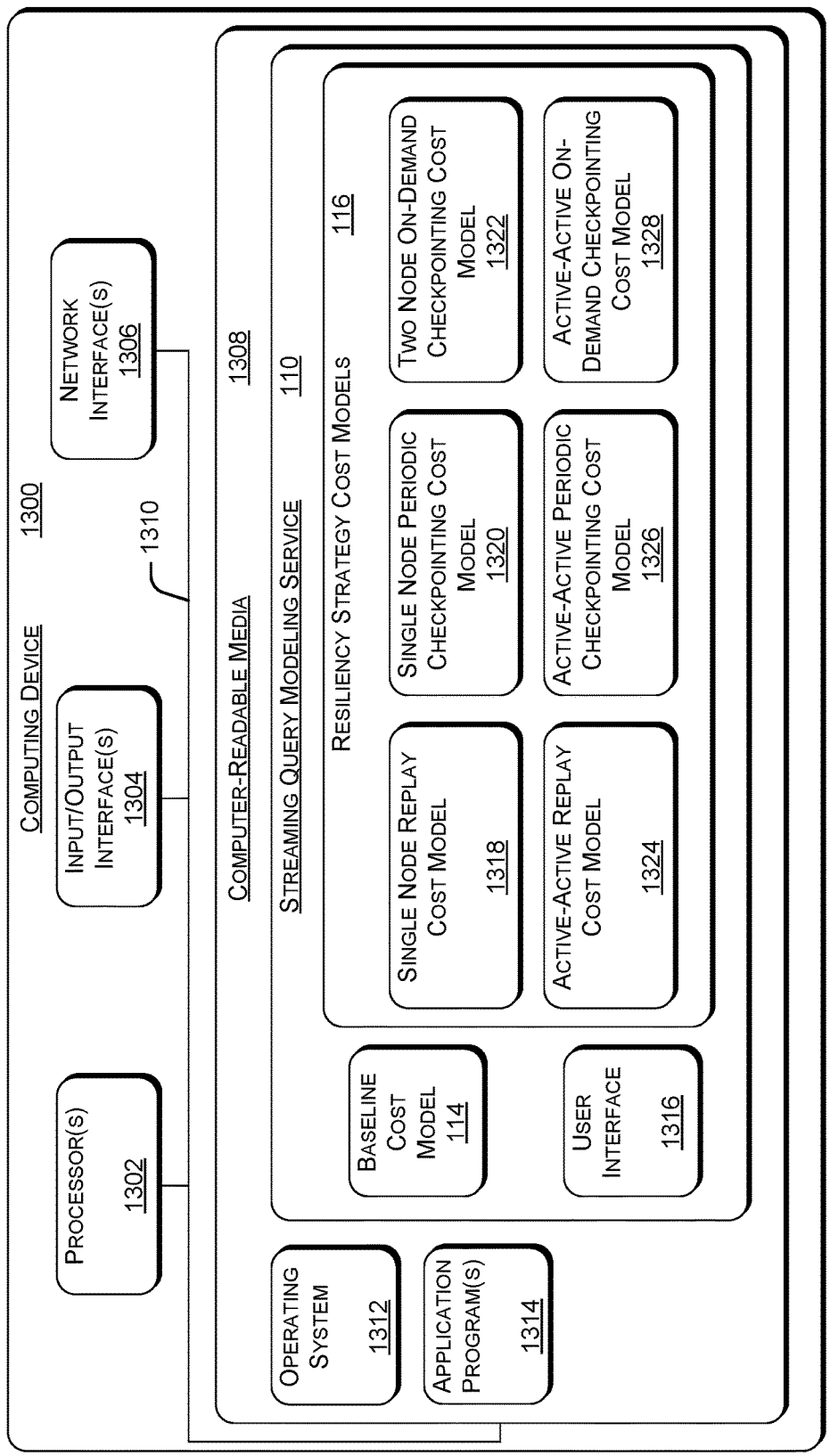
FIG. 13 is a block diagram illustrates select components of an example computing device configured to implement a streaming query modeling service to calculate costs associated with implementing a streaming query deployment according to one or more resiliency strategies.

FIG. 13 illustrates select components of an example computing device 1300 configured to implement a streaming query modeling service to calculate costs associated with implementing a streaming query deployment according to one or more resiliency strategies. FIG. 13 may correspond, for example, to computing device 112 shown in FIG. 1.

Example computing device 1300 includes one or more processors 1302, input/output interface(s) 1304, network interface(s) 1306, and computer-readable media 1308, each operably connected to the others such as via a bus 1310. Bus 1310 may include, for example, one or more of a system bus, a data bus, an address bus, a PCI bus, a Mini-PCI bus, and any variety of local, peripheral, and/or independent buses.

Processor 1302 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Input/output interfaces 1304 are configured to enable computing device 1300 to receive input or send output. For example, input may be received via a keyboard, mouse, touch screen, or any other type of input device. Similarly, for example, output may be presented via a display, speakers, or any other output device.

Network interfaces 1306 are configured to enable communications between computing device 1300 and other networked devices. Network interfaces 1306 can include, for example, one or more network interface controllers (NICs) or other types of transceiver devices to send and receive communications over a network.

Computer-readable media 1308 can store instructions executable by the processor 1302. Computer-readable media 1308 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 1300, while in some examples one or more of a CPU, GPU, and/or accelerator is external to computing device 1300.

Computer-readable media 1308 may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Computer-readable media 1308 can be examples of computer storage media. Thus, the computer-readable media 1308 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Executable instructions stored on computer-readable media 1308 can include, for example, an operating system 1312, streaming query modeling service 110, any number of application programs 1314, and other modules, programs, or applications that are loadable and executable by processor 1302.

Streaming query modeling service 110 includes baseline cost model 114, resiliency strategy cost models 116, and a user interface 1316. In the illustrated example, resiliency strategy cost models 116 include single node replay cost model 1318, single node periodic checkpointing cost model 1320, two node on-demand checkpointing cost model 1322, active-active replay cost model 1324, active-active periodic checkpointing cost model 1326, and active-active on-demand checkpointing cost model 1328. In various examples, resiliency strategy cost models 116 may include more cost models, fewer cost models, or different cost models than those illustrated in FIG. 13.

In an example, user interface 1316 provides a mechanism to receive input parameters associated with an actual or proposed streaming query deployment. For example, as described above, input parameters may include values representing an the input rate, an SLA, a checkpoint size, a window size, a mean time between failure for a single node, a number of copies in replicated storage, a checkpoint period for periodic checkpointing, and a number of running copies. User interface 1316 may also enable streaming query modeling service 110 to output data representing costs to implement one or more resiliency strategies and/or recommendations for implementing one or more resiliency strategies.

In at least one example, rather than receiving input parameters via a user interface, streaming query modeling service 110 may receive, for example via network interface 1306, one or more input parameters from a server on which at least a portion of a streaming query is currently deployed.

Single node replay cost model 1330 is configured to calculate costs associated with implementing a single node replay resiliency strategy for a streaming query deployment defined by the received input parameters. Example single node replay models are described above with reference to FIG. 7.

Single node periodic checkpointing cost model 1332 is configured to calculate costs associated with implementing a single node periodic checkpointing resiliency strategy for a streaming query deployment defined by the received input parameters. An example single node periodic checkpointing model is described above with reference to FIG. 11.

Two node on-demand checkpointing cost model 1334 is configured to calculate costs associated with implementing a two node on-demand checkpointing resiliency strategy for a streaming query deployment defined by the received input parameters. An example two node on-demand checkpointing model is described above with reference to FIG. 9.

Active-active replay cost model 1336 is configured to calculate costs associated with implementing an active-active replay resiliency strategy for a streaming query deployment defined by the received input parameters. An example active-active replay model is described above with reference to FIG. 10.

Active-active periodic checkpointing cost model 1338 is configured to calculate costs associated with implementing an active-active periodic checkpointing resiliency strategy for a streaming query deployment defined by the received input parameters. An example active-active periodic checkpointing model is described above with reference to FIG. 8.

Active-active on-demand checkpointing cost model 1340 is configured to calculate costs associated with implementing an active-active on-demand checkpointing resiliency strategy for a streaming query deployment defined by the received input parameters. An example active-active on-demand checkpointing model is described above with reference to FIG. 12.

Methods for Modeling Resiliency Strategy Costs

FIGs. illustrates an example method performed by the front-end extensions 116 to the processor pipeline. FIGS. 7 and 8 illustrate example methods performed by the back-end extensions 118 to the processor pipeline. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 14:
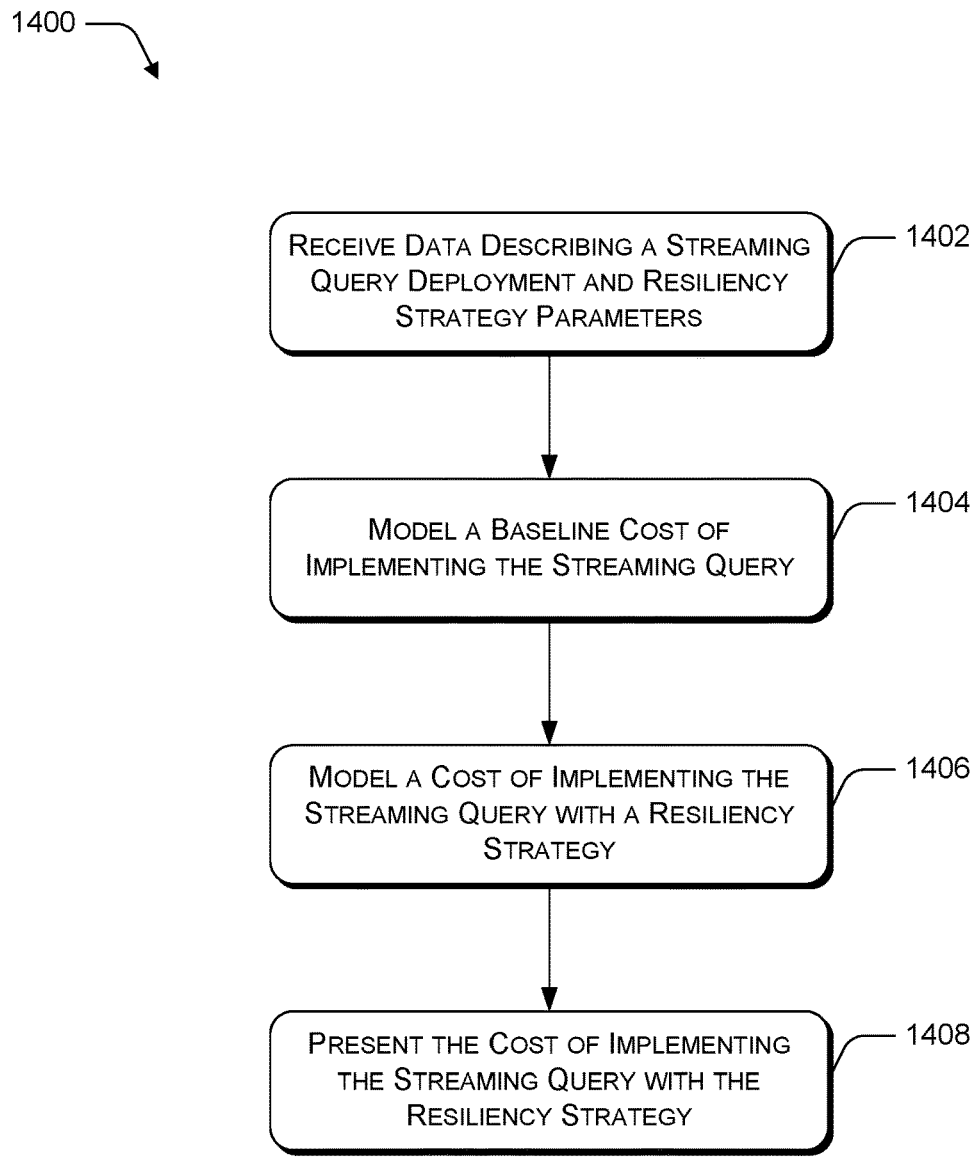
FIG. 14 is a flow diagram of an example method for modeling costs associated with implementing a streaming query according to a resiliency strategy.

FIG. 14 illustrates an example method 1400 for modeling costs associated with implementing a streaming query according to a resiliency strategy. At block 1402, data describing a streaming query deployment and resiliency strategy parameters are received. For example, infrastructure parameters, K and $F_T$, may be received to represent, for a particular streaming query deployment, a number of copies in replicated storage and a mean time between failure for a single compute node, respectively. In addition, an SLA specification is received to indicate the maximum downtime to be allowed if the streaming query is implemented according to a resiliency strategy. Additional application parameters may include one or more of a window size, a checkpoint size, or an input rate.

At block 1404 a baseline cost of implementing the streaming query is modeled. For example, baseline cost model 114 determines a baseline cost of implementing the streaming query non-resiliently, as described above with reference to FIG. 2. As described herein the baseline cost is calculated according to Equation (1) based on the received infrastructure parameters.

At block 1406 a cost of implementing the streaming query according to a resiliency strategy is modeled. For example, for each of one or more resiliency strategies, streaming query modeling service 110 calculates a recovery NIC bandwidth reservation sufficient to meet the SLA, represented as a factor of the input bandwidth. The streaming query modeling service 110 also calculates the cost, in terms of total reserved NIC bandwidth, as a factor of the NIC costs associated with running the query non-resiliently (i.e., the baseline cost).

At block 1408, the cost of implementing the streaming query with the resiliency strategy is presented. For example, the costs calculated as described above with reference to block 1406 are presented via the user interface 1316.

Figure 15:
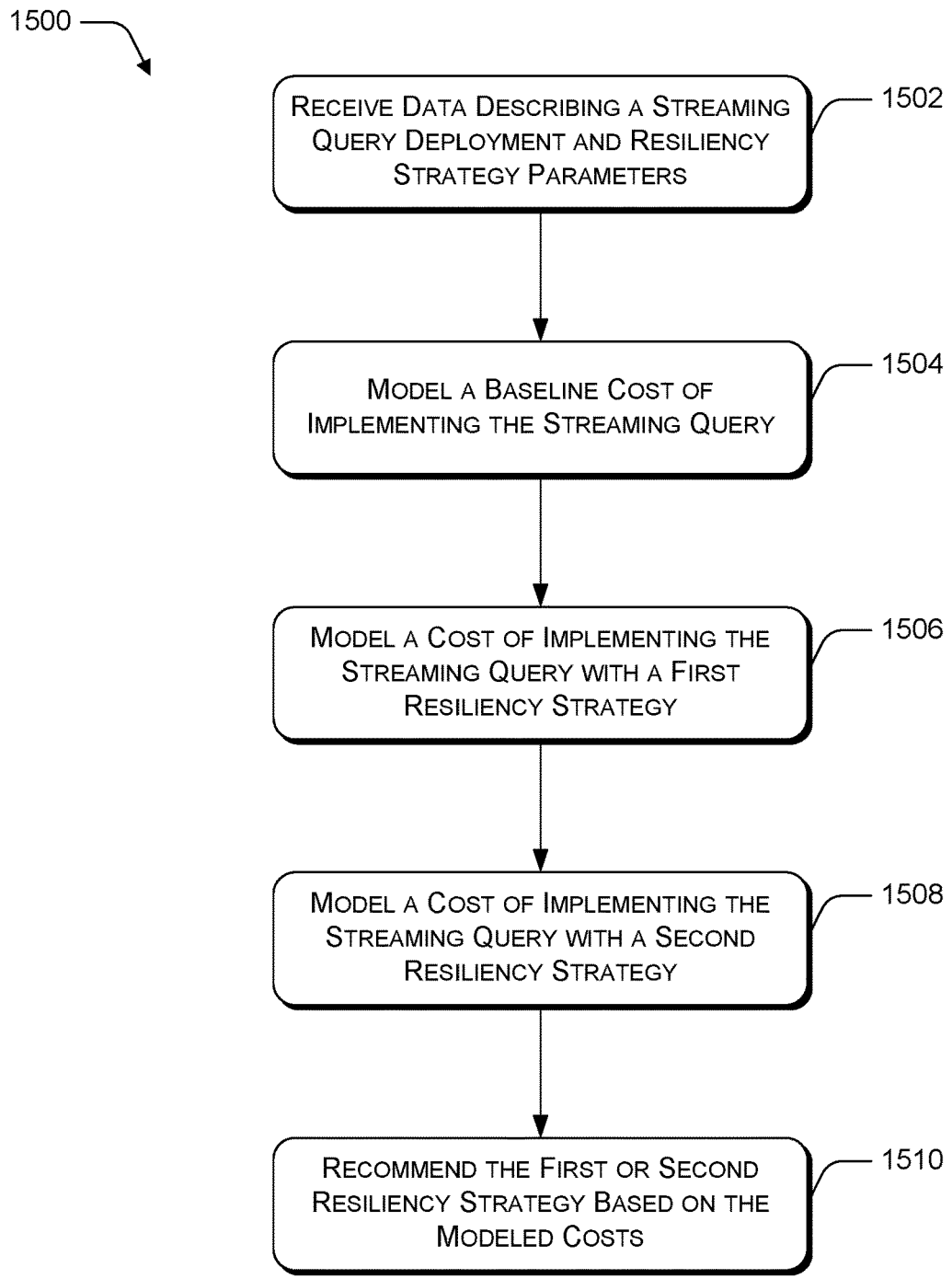
FIG. 15 is a flow diagram of an example method for recommending a resiliency strategy for a streaming query by modeling costs associated with implementing the streaming query according to multiple resiliency strategies.

FIG. 15 illustrates an example method 1500 for recommending a resiliency strategy for a streaming query by modeling costs associated with implementing the streaming query according to multiple resiliency strategies. At block 1502, data describing a streaming query deployment and resiliency strategy parameters are received. For example, infrastructure parameters, K and $F_T$, may be received to represent, for a particular streaming query deployment, a number of copies in replicated storage and a mean time between failure for a single compute node, respectively. In addition, an SLA specification is received to indicate the maximum downtime to be allowed if the streaming query is implemented according to a resiliency strategy. Additional application parameters may include one or more of a window size, a checkpoint size, or an input rate.

At block 1504 a baseline cost of implementing the streaming query is modeled. For example, baseline cost model 114 determines a baseline cost of implementing the streaming query non-resiliently, as described above with reference to FIG. 2. As described herein the baseline cost is calculated according to Equation (1) based on the received infrastructure parameters.

At block 1506 a cost of implementing the streaming query according to a first resiliency strategy is modeled. For example, for a first resiliency strategy of multiple resiliency strategies, streaming query modeling service 110 calculates a recovery NIC bandwidth reservation sufficient to meet the SLA, represented as a factor of the input bandwidth. The streaming query modeling service 110 also calculates the cost, in terms of total reserved NIC bandwidth, as a factor of the NIC costs associated with running the query non-resiliently (i.e., the baseline cost).

At block 1508 a cost of implementing the streaming query according to a second resiliency strategy is modeled. For example, for a second resiliency strategy of multiple resiliency strategies, streaming query modeling service 110 calculates a recovery NIC bandwidth reservation sufficient to meet the SLA, represented as a factor of the input bandwidth. The streaming query modeling service 110 also calculates the cost, in terms of total reserved NIC bandwidth, as a factor of the NIC costs associated with running the query non-resiliently (i.e., the baseline cost).

At block 1510, the first resiliency strategy or the second resiliency strategy is recommended based, at least in part, on the costs modeled as described above with reference to blocks 1506 and 1508. In an example, streaming query modeling service may recommend a resiliency strategy based on a comparison of the costs to implement each of the first and second resiliency strategy. In an example, the comparison and recommendation may be based on the recovery NIC bandwidth reservation sufficient to meet the SLA or the cost in terms of total reserved NIC bandwidth. In an alternative example, the comparison and recommendation may be based on a weighted combination of the recovery NIC bandwidth reservation sufficient to meet the SLA and the cost in terms of total reserved NIC bandwidth.

Furthermore, while FIG. 15 illustrates a recommendation of one of two modeled resiliency strategies, it is recognized that resiliency strategy modeling service 110 can model, compare, and/or make recommendations based on any number of resiliency strategies.

Example Clauses

A: A method comprising: receiving input parameters that define a streaming query scenario to be implemented to comply with a service level agreement (SLA) specification; based at least on the input parameters that are received: modeling a baseline cost of implementing the streaming query scenario without a resiliency strategy; and modeling a cost of implementing the streaming query scenario with a particular resiliency strategy to comply with the SLA specification; and presenting the cost of implementing the streaming query scenario with the particular resiliency strategy to comply with the SLA specification.

B: A method as paragraph A recites, wherein the baseline cost of implementing the streaming query scenario without a resiliency strategy includes bandwidth costs measured at network interface cards (NICs).

C: A method as paragraph A or paragraph B recites, wherein the cost of implementing the streaming query scenario with a particular resiliency strategy to comply with the SLA specification includes a recovery network interface card (NIC) bandwidth reservation sufficient to meet the SLA.

D: A method as paragraph C recites, wherein the recovery NIC bandwidth reservation sufficient to meet the SLA is expressed as a factor of an input bandwidth.

E: A method as any of paragraphs A-D recite, wherein the cost of implementing the streaming query scenario with a particular resiliency strategy to comply with the SLA specification includes a total reserved network interface card (NIC) bandwidth.

F: A method as paragraph E recites, wherein the total reserved NIC bandwidth is expressed as a factor of the baseline cost.

G: A method as any of paragraphs A-F recite, wherein: the baseline cost of implementing the streaming query scenario without a resiliency strategy is a first cost; the cost of implementing the streaming query scenario with the particular resiliency strategy to comply with the SLA specification is a second cost; and presenting the cost of implementing the streaming query scenario with the particular resiliency strategy to comply with the SLA specification includes presenting the second cost as a factor of the first cost.

H: A method as any of paragraphs A-G recite, wherein the particular resiliency strategy is a first resiliency strategy, the method further comprising: based at least on the input parameters that are received, calculating a cost of implementing the streaming query scenario with a second resiliency strategy to comply with the SLA specification; and recommending the first resiliency strategy over the second resiliency strategy based on a determination that the cost of implementing the streaming query scenario with the first resiliency strategy to comply with the SLA specification is less than the cost of implementing the streaming query scenario with the second resiliency strategy to comply with the SLA specification.

I: A method as any of paragraphs A-H recite, wherein the input parameters comprise: an SLA, wherein the SLA defines a fraction of time that the streaming query's response to input is unaffected by failure; a mean time between failure for a single compute node; a number of copies in replicated storage; and an input rate.

J: A method as paragraph I recites, wherein the input parameters further comprise one or more of: a window size; or a checkpoint size.

K: A method as any of paragraphs A-J recite, wherein the particular resiliency strategy is one of: a single node replay resiliency strategy; or an active-active replay resiliency strategy.

L: A method as any of paragraphs A-J recite, wherein the particular resiliency strategy is one of: a single node periodic checkpointing resiliency strategy; or an active-active periodic checkpointing resiliency strategy.

M: A method as any of paragraphs A-J recite, wherein the particular resiliency strategy is a two node on-demand checkpointing resiliency strategy.

N: A method as any of paragraphs A-J recite, wherein the particular resiliency strategy is an active-active on-demand checkpointing resiliency strategy implemented with three or more compute nodes.

O: A system comprising: a processor; a memory, communicatively coupled to the processor; an interface to receive parameters associated with a streaming query deployment and a service level agreement (SLA); a streaming query modeling service stored in the memory and executed on the processor, the streaming query modeling service including: a baseline cost model to model a cost of deploying the streaming query without a resiliency strategy; and a resiliency strategy cost model to model a cost of deploying the streaming query with a resiliency strategy to satisfy the SLA; and an interface to present the cost of deploying the streaming query with the resiliency strategy to satisfy the SLA.

P: A system as paragraph O recites, wherein the resiliency strategy is one of: a replay-based resiliency strategy; a periodic checkpointing-based resiliency strategy; or an on-demand checkpointing-based resiliency strategy.

Q: One or more computer readable media having computer-executable instructions stored thereon, which, when executed by a computing device, cause the computing device to perform operations comprising: modeling a baseline cost of deploying a streaming query with no resiliency strategy; modeling a resiliency cost of deploying the streaming query with a resiliency strategy to satisfy a service level agreement.

R: One or more computer readable media as paragraph Q recites, wherein modeling the resiliency cost includes determining a recovery network interface card (NIC) bandwidth reservation sufficient to meet the SLA.

S: One or more computer readable media as paragraph Q or paragraph S recites, wherein modeling the resiliency cost includes determining a total reserved network interface card (NIC) bandwidth.

T: One or more computer-readable media as any of paragraphs Q-S recite, wherein the resiliency strategy is a periodic checkpoint-based resiliency strategy, the operations further comprising determining a checkpointing frequency to minimize the resiliency cost.

Conclusion

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 112 and/or 1300 such as one or more internal or external CPUs or GPUs, and/or one or more pieces of hardware logic such as FPGAs, DSPs, or other types of accelerators.

All of the methods and processes described above may be embodied in, and fully automated via, specialized computer hardware. Some or all of the methods may alternatively be embodied in software code modules executed by one or more general purpose computers or processors. The code modules may be stored in any type of computer-readable storage medium or other computer storage device.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
receiving input parameters that define a streaming query scenario to be implemented to comply with a service specification;

based at least on the input parameters that are received:
modeling a baseline cost of implementing the streaming query scenario without a strategy to protect against failure or data loss, wherein the baseline cost is measured in units of time; and
modeling a cost of implementing the streaming query scenario with a particular strategy to comply with the service specification, wherein the particular strategy protects against failure or data loss; and
presenting the cost of implementing the streaming query scenario with the particular strategy to comply with the service specification, wherein the particular strategy is either a two node on-demand checkpointing strategy or an active-active on-demand checkpointing strategy implemented with three or more compute nodes, wherein:
the particular strategy is an active-active on-demand checkpointing strategy implemented with three or more compute nodes; and
the active-active on-demand checkpointing strategy comprises:
redundantly executing the streaming query three or more times at the three or more compute nodes; and
upon failure of a first one of the compute nodes, recovering the first one of the compute nodes using a second one of the compute nodes.

2. A method as recited in claim 1, wherein the baseline cost of implementing the streaming query scenario without a strategy includes bandwidth costs measured at one or more network interface cards (NICs).

3. A method as recited in claim 1, wherein the cost of implementing the streaming query scenario with a particular strategy to comply with the service specification includes a recovery network interface card (NIC) bandwidth reservation sufficient to meet the service specification.

4. A method as recited in claim 3, wherein the recovery NIC bandwidth reservation sufficient to meet the service specification is expressed as a factor of an input bandwidth.

5. A method as recited in claim 1, wherein the cost of implementing the streaming query scenario with a particular strategy to comply with the service specification includes a total reserved network interface card (NIC) bandwidth.

6. A method as recited in claim 5, wherein the total reserved NIC bandwidth is expressed as a factor of the baseline cost.

7. A method as recited in claim 1, wherein:
the baseline cost of implementing the streaming query scenario without a strategy is a first cost;
the cost of implementing the streaming query scenario with the particular strategy to comply with the service specification is a second cost; and
presenting the cost of implementing the streaming query scenario with the particular strategy to comply with the service specification includes presenting the second cost as a factor of the first cost.

8. A method as recited in claim 1, wherein the particular strategy is a first strategy, the method further comprising:
based at least on the input parameters that are received, calculating a cost of implementing the streaming query scenario with a second strategy to comply with the service specification; and
recommending the first strategy over the second strategy based on a determination that the cost of implementing the streaming query scenario with the first strategy to comply with the service specification is less than the cost of implementing the streaming query scenario with the second strategy to comply with the service specification.

9. A method as recited in claim 1, wherein the input parameters comprise:
the service specification, wherein the service specification defines a fraction of time that the streaming query's response to input is unaffected by failure;
a mean time between failure for a single compute node;
a number of copies in replicated storage; and
an input rate.

10. A method as recited in claim 9, wherein the input parameters further comprise one or more of:
a window size;
or a checkpoint size.

11. A method as recited in claim 1, wherein the particular strategy is one of:
a single node replay strategy;
or an active-active replay strategy.

12. A method as recited in claim 1, wherein the particular strategy is one of:
a single node periodic checkpointing strategy;
or an active-active periodic checkpointing strategy.

13. A method as recited in claim 1, wherein the particular strategy is a two node on-demand checkpointing strategy.

14. A method as recited in claim 1, wherein the particular strategy is an active-active on-demand checkpointing strategy implemented with three or more compute nodes.

15. The method of claim 1, wherein the baseline cost is measured at one or more network interface cards (NICs).

16. A system comprising:
a processor;
a memory, communicatively coupled to the processor;
an interface to receive parameters associated with a streaming query deployment and a service specification;
a streaming query modeling service stored in the memory and executed on the processor, the streaming query modeling service including:
a baseline cost model to model a cost of deploying the streaming query without a strategy to protect against failure or data loss, wherein the baseline cost is measured in units of time; and
a strategy cost model to model a cost of deploying the streaming query with a particular strategy to satisfy the service specification, wherein the particular strategy protects against failure or data loss; and
an interface to present the cost of deploying the streaming query with the particular strategy to satisfy the service specification, wherein the particular strategy is either a two node on-demand checkpointing strategy or an active-active on-demand checkpointing strategy implemented with three or more compute nodes, wherein:
the particular strategy is an active-active on-demand checkpointing strategy implemented with three or more compute nodes; and
the active-active on-demand checkpointing strategy comprises:
redundantly executing the streaming query three or more times at the three or more compute nodes; and
upon failure of a first one of the compute nodes, recovering the first one of the compute nodes using a second one of the compute nodes.

17. A system as recited in claim 16, wherein the particular strategy is one of:
- a replay-based strategy;
- a periodic checkpointing-based strategy; or
- an on-demand checkpointing-based strategy.

18. One or more non-transitory computer readable media having computer-executable instructions stored thereon, which, when executed by a computing device, cause the computing device to perform operations comprising:
- receiving input parameters that define a streaming query scenario to be implemented to comply with a service specification;
- based at least on the input parameters that are received:
  - modeling a baseline cost of implementing the streaming query scenario without a strategy to protect against failure or data loss, wherein the baseline cost is measured in units of time; and
  - modeling a cost of implementing the streaming query scenario with a particular strategy to comply with the service specification, wherein the particular strategy protects against failure or data loss; and
- presenting the cost of implementing the streaming query scenario with the particular strategy to comply with the service specification, wherein the particular strategy is either a two node on-demand checkpointing strategy or an active-active on-demand checkpointing strategy implemented with three or more compute nodes, wherein:
  - the particular strategy is an active-active on-demand checkpointing strategy implemented with three or more compute nodes; and
  - the active-active on-demand checkpointing strategy comprises:
    - redundantly executing the streaming query three or more times at the three or more compute nodes; and
    - upon failure of a first one of the compute nodes, recovering the first one of the compute nodes using a second one of the compute nodes.

19. One or more computer readable media as recited in claim 18, wherein modeling the cost of implementing the streaming query scenario with the particular strategy includes determining a recovery network interface card (NIC) bandwidth reservation sufficient to meet the service specification.

20. One or more computer readable media as recited in claim 18, wherein modeling the cost of implementing the streaming query scenario with the particular strategy includes determining a total reserved network interface card (NIC) bandwidth.

21. One or more computer-readable media as recited in claim 18, wherein the particular strategy is a periodic checkpoint-based strategy, the operations further comprising determining a checkpointing frequency to minimize the cost of implementing the streaming query scenario with the particular strategy.

* * * * *